United States Patent [19]
Tooley et al.

[11] 3,979,719
[45] Sept. 7, 1976

[54] MULTIPLE BLOCK BINARY SYNCHRONOUS DUPLEX COMMUNICATIONS SYSTEM AND ITS METHOD OF OPERATION

[75] Inventors: John R. Tooley; Larry D. Scott; Hatcher E. Chalkley, all of Austin, Tex.

[73] Assignee: Texas Instruments Incorporated, Dallas, Tex.

[22] Filed: Mar. 3, 1975

[21] Appl. No.: 554,817

Related U.S. Application Data
[63] Continuation of Ser. No. 347,252, April 2, 1973, abandoned.

[52] U.S. Cl. .................................... 340/146.1 BA
[51] Int. Cl.² ........................................ G08C 25/00
[58] Field of Search ............................ 340/146.1 BA

[56] References Cited
UNITED STATES PATENTS

| | | | |
|---|---|---|---|
| 3,456,239 | 7/1969 | Glasson ..................... | 340/146.1 BA |
| 3,473,150 | 10/1969 | McClelland ............... | 340/146.1 BA |
| 3,605,091 | 9/1971 | Tong ......................... | 340/146.1 BA |
| 3,646,518 | 2/1972 | Weinstein ................. | 340/146.1 BA |
| 3,671,945 | 6/1972 | Maggio, Jr. ................ | 340/146.1 BA |
| 3,676,846 | 7/1972 | Busch ........................ | 340/146.1 BA |

FOREIGN PATENTS OR APPLICATIONS

| | | | |
|---|---|---|---|
| 1,224,388 | 3/1971 | United Kingdom ....... | 340/146.1 BA |
| 888,983 | 2/1962 | United Kingdom ....... | 340/146.1 BA |

*Primary Examiner*—Charles E. Atkinson
*Attorney, Agent, or Firm*—Hal Levine; Leo N. Heiting; Rene' E. Grossman

[57] ABSTRACT

A multiple block binary synchronous duplex communications system provides for the orderly transfer of data from one location to another utilizing communications facilities. This communications system increases the efficiency of data links with long propagation delays or with long processing times at either end by maintaining a continuous flow of data and responses in both directions. The memory of the communications link is kept full at all times. Data is transmitted in blocks including an identification code. The received data is checked for errors. When errors occur the transmission of data is not stopped; data is continuously transmitted and signals are returned including the block identification of the block containing the error. The block containing the error is then retransmitted when the transmitting station of the communications system is available for this task.

5 Claims, 16 Drawing Figures

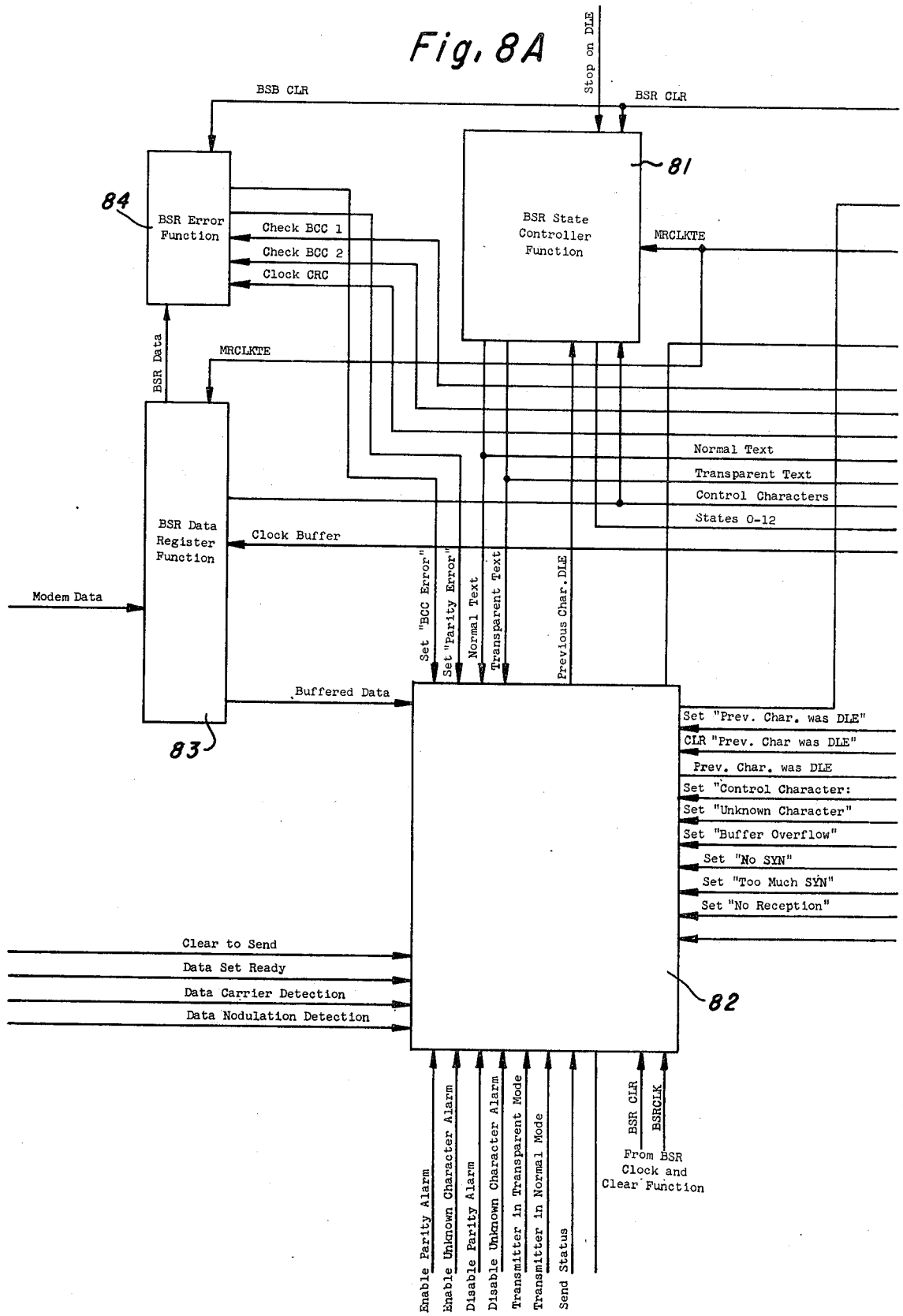

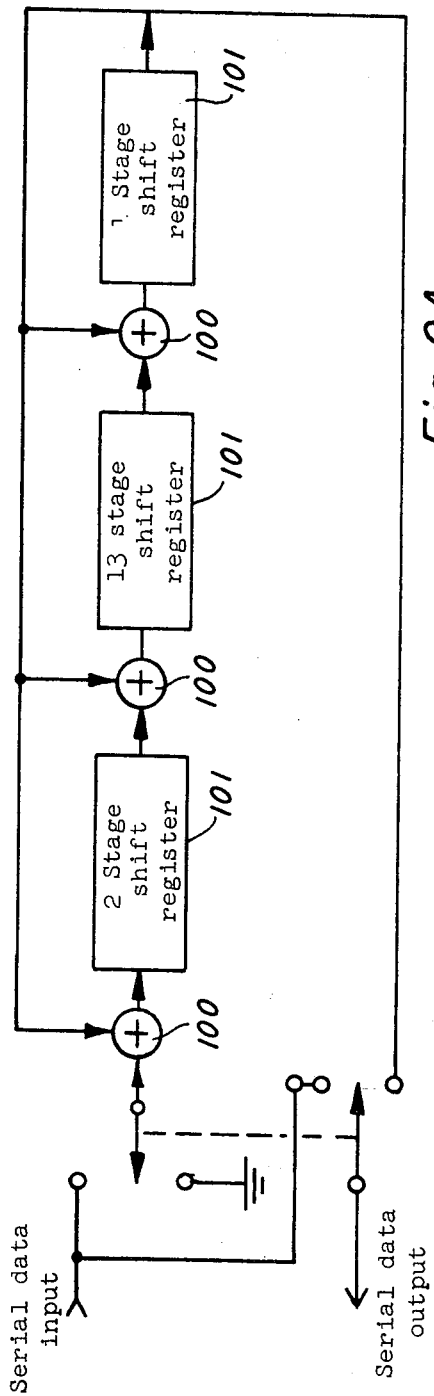
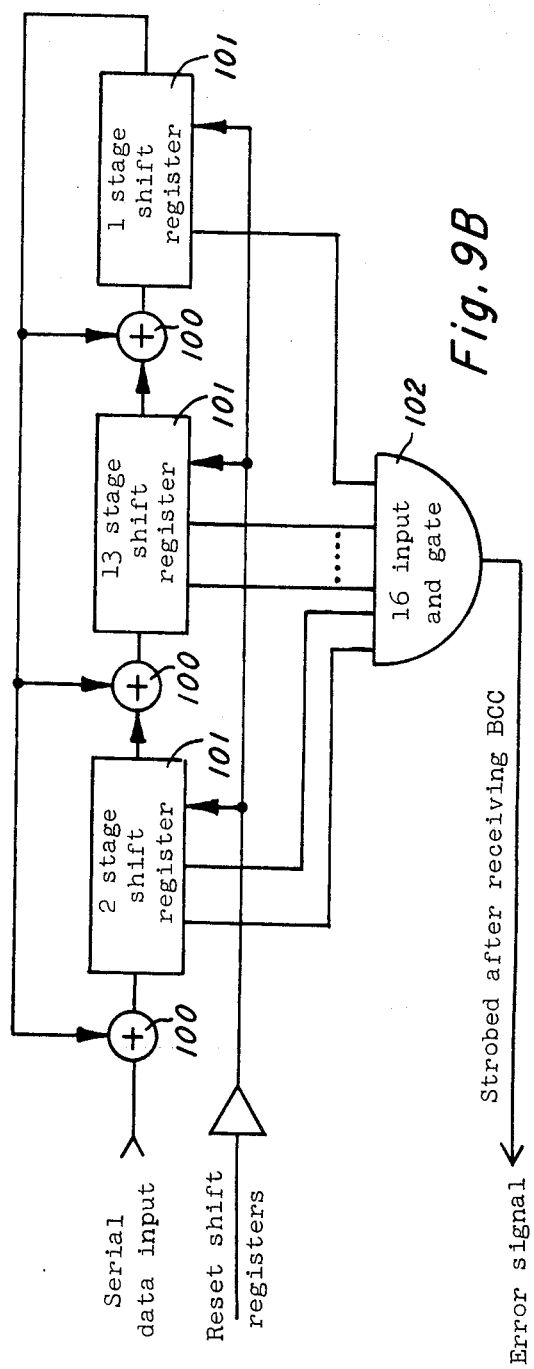

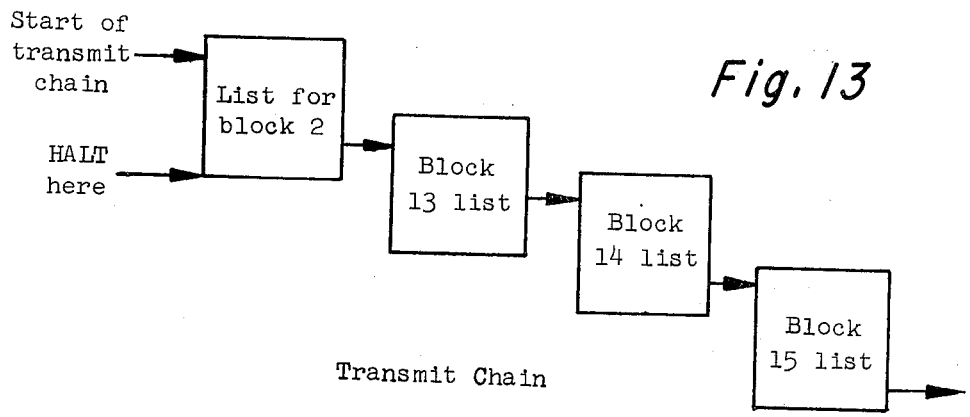
Transmit Chain
*Fig. 13*
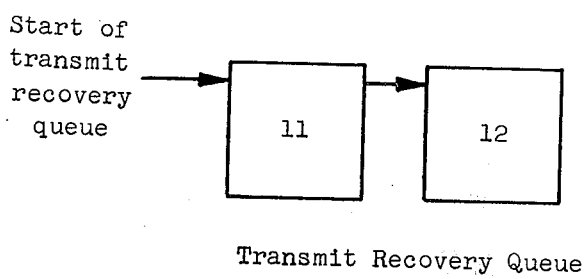
Transmit Recovery Queue
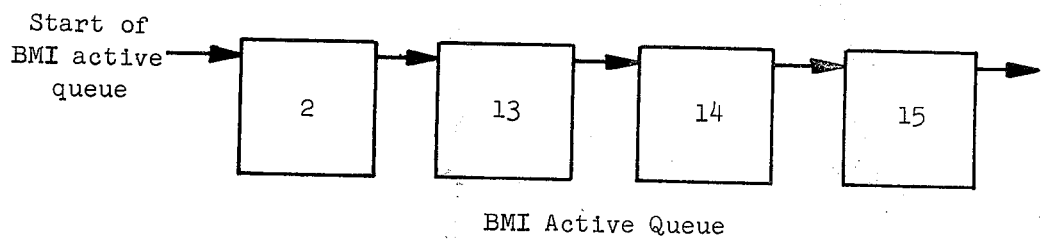
BMI Active Queue
Queue linkage prior to halt servicing

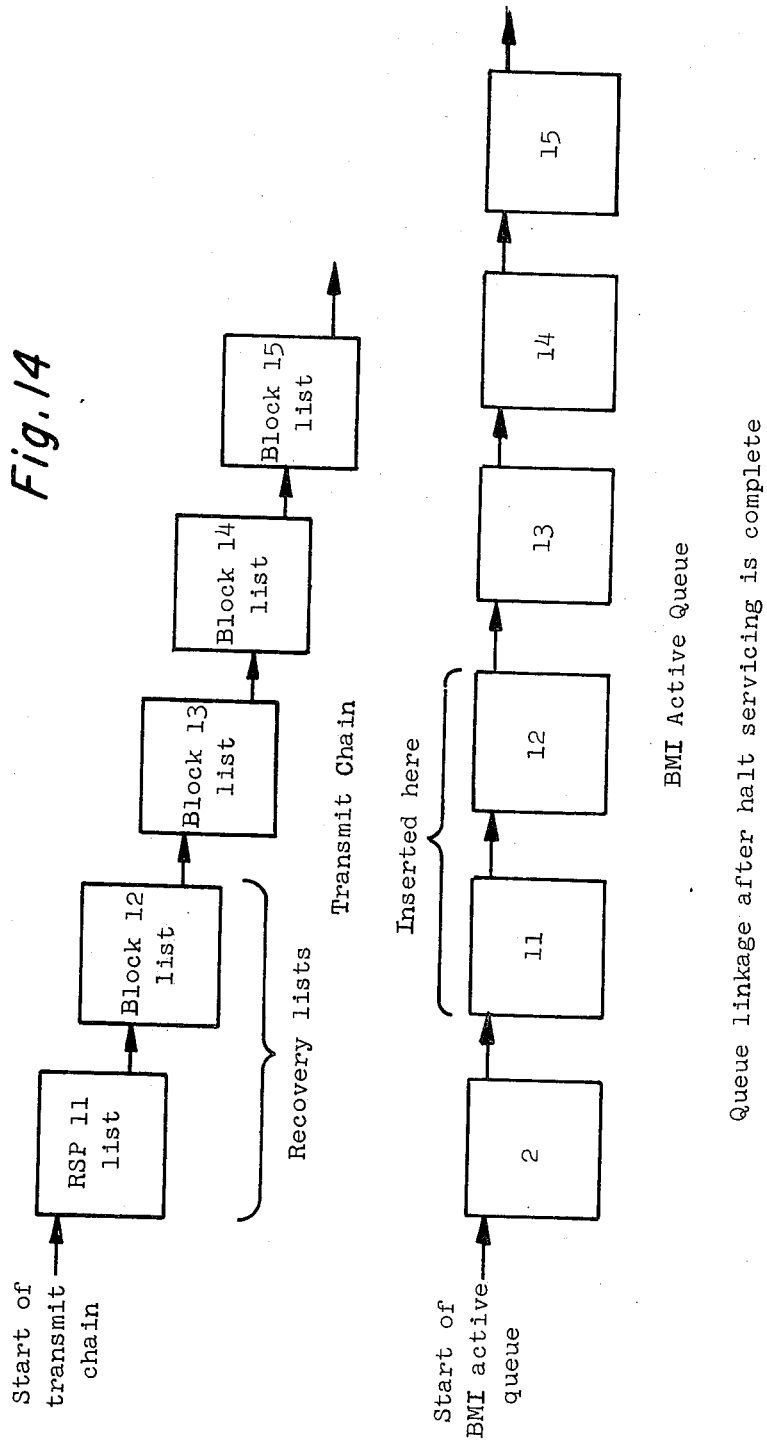

MULTIPLE BLOCK BINARY SYNCHRONOUS DUPLEX COMMUNICATIONS SYSTEM AND ITS METHOD OF OPERATION

This is a continuation, of application Ser. No. 347,252, filed April 2, 1973 and now abandoned.

This invention relates to data communications systems and more particularly to data communications systems for synchronously transmitting multiple blocks of binary data in both directions simultaneously.

Various systems for transmitting multiple blocks have been utilized in the art. In these systems a fixed number of blocks is transmitted before a response is transmitted. In some systems, for example, protocol allows for two or three blocks to be transmitted before a response must be received. In still further systems, multiple blocks are transmitted before a response. However, in these systems, when an error is encountered in a block, this block and all subsequent blocks transmitted after the last response must be retransmitted whether in error or not.

It is an object of the present invention to provide a communications system with increased efficiency of data links with long propagation delays. It is another object of the invention to provide a communications system which increases the efficiency of data links with long processing times at either the transmitting or receiving stations. A further object of the invention is to provide a multiple block binary synchronous duplex communications protocol system in which a received error in a block of data does not require the retransmission of blocks other than the block containing the error.

In accordance with the present invention, a continuous flow of data and responses is maintained in both directions and the memory of the communications link is kept full. The multiple block binary synchronous duplex communications protocol system allows as many blocks to be transmitted as there are buffers in the transmission system. A feature of the invention is that it allows any number of blocks to be transmitted before a response while requiring retransmission of only erroneous data blocks. This is accomplished by utilizing block identification codes which are transmitted immediately preceding each block. Each block of data transmitted is error checked at the receiving station by use of vertical or cyclic redundancy checking. If the redundancy check does not prove correct, the receiving station will transmit a control message which will cause the transmitting station to transmit only the identified data block containing the error as the transmitting station becomes available for this task.

Further objects and advantages of the invention will be apparent from the detailed description and claims and from the features illustrated in the drawings wherein:

Figure 5:
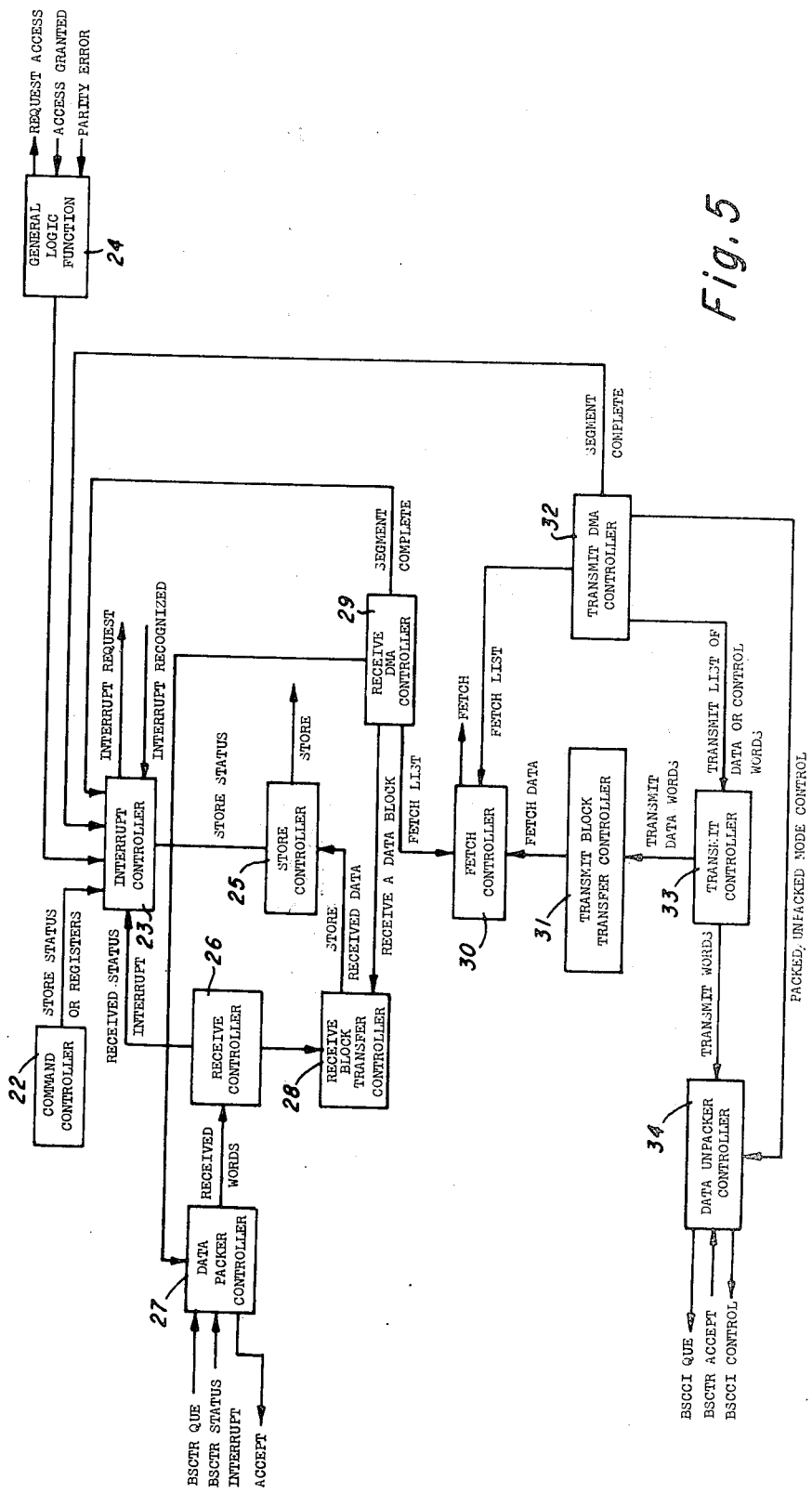
Figure 6:
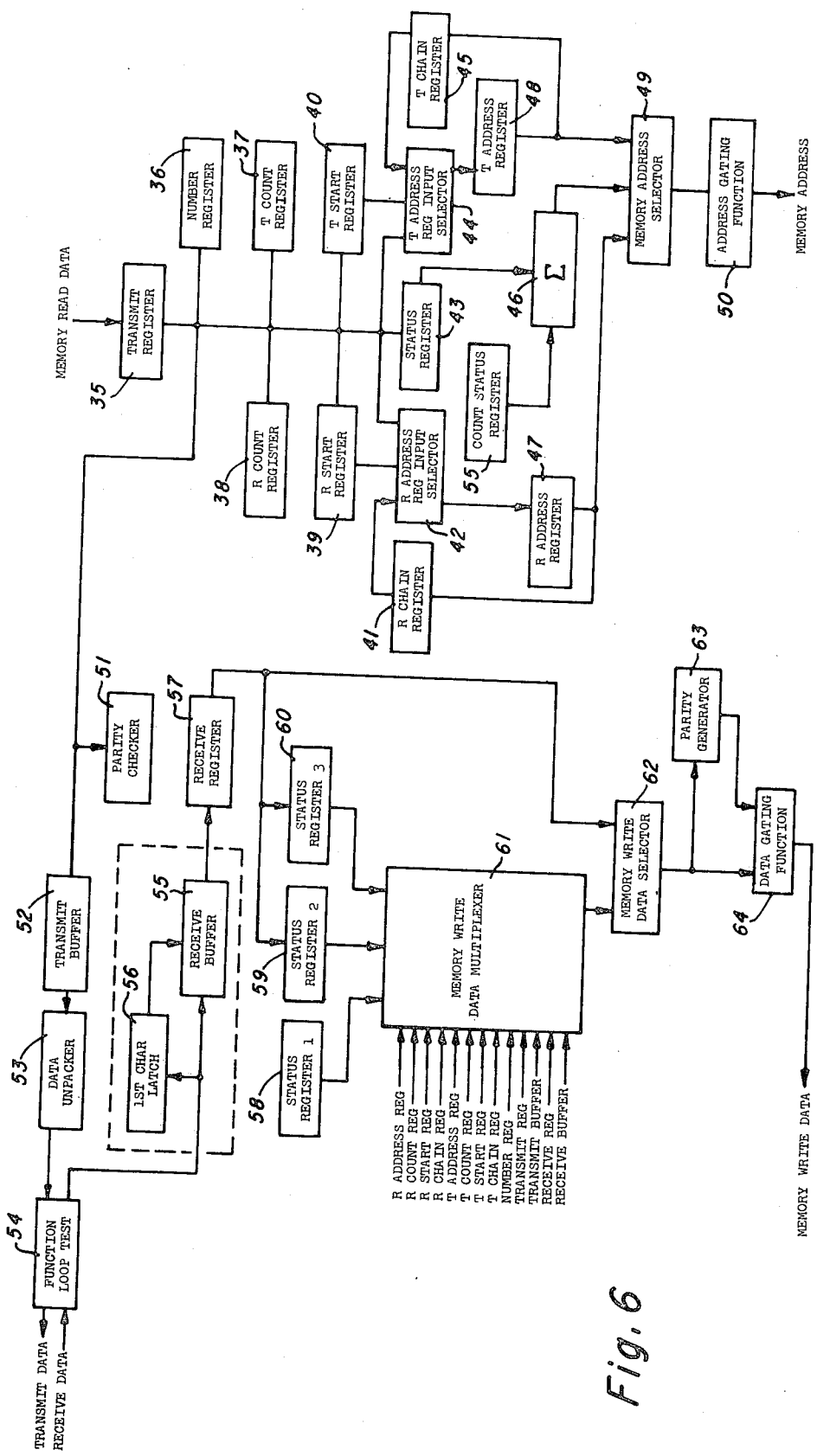
Figure 7:
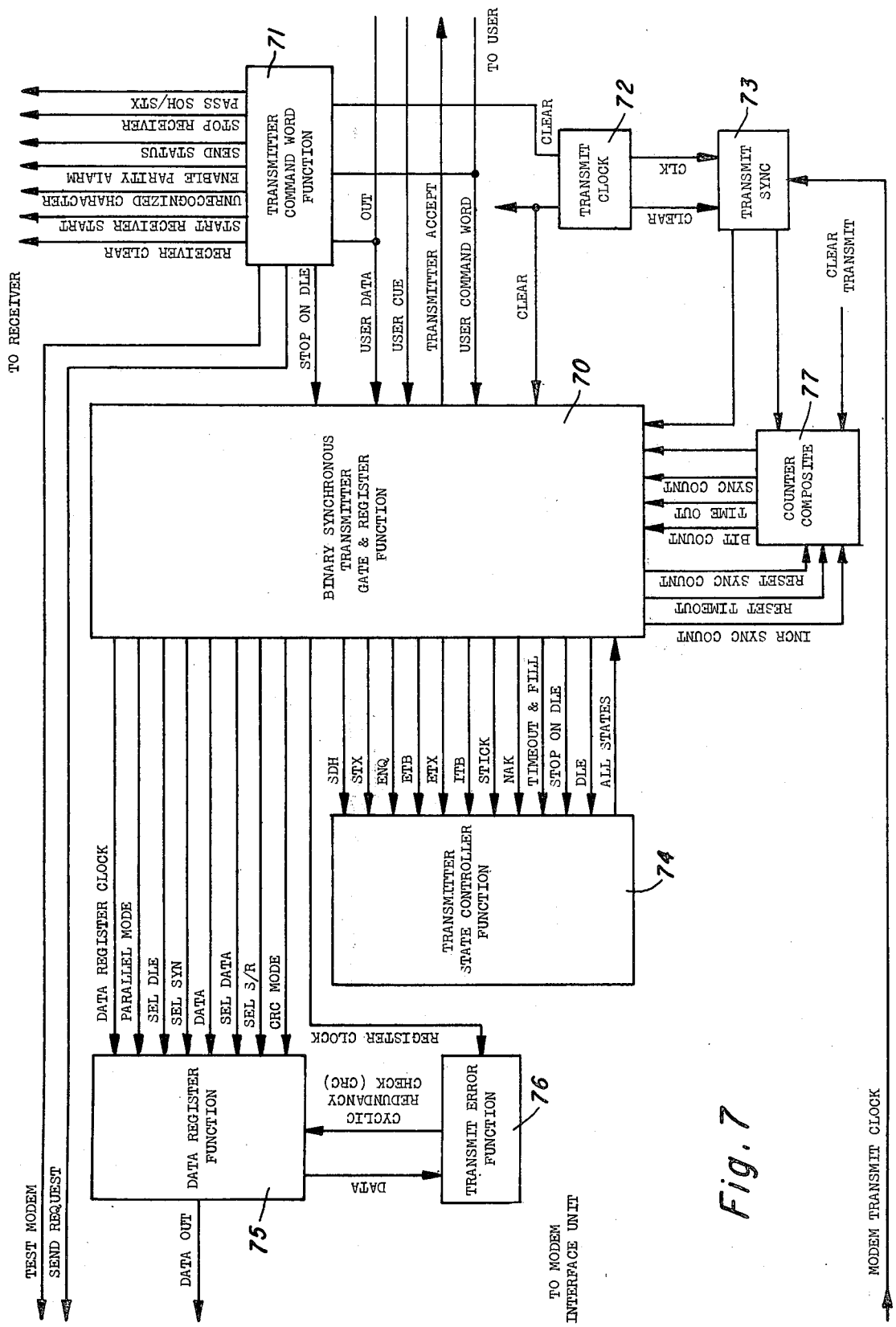
Figure 8B:
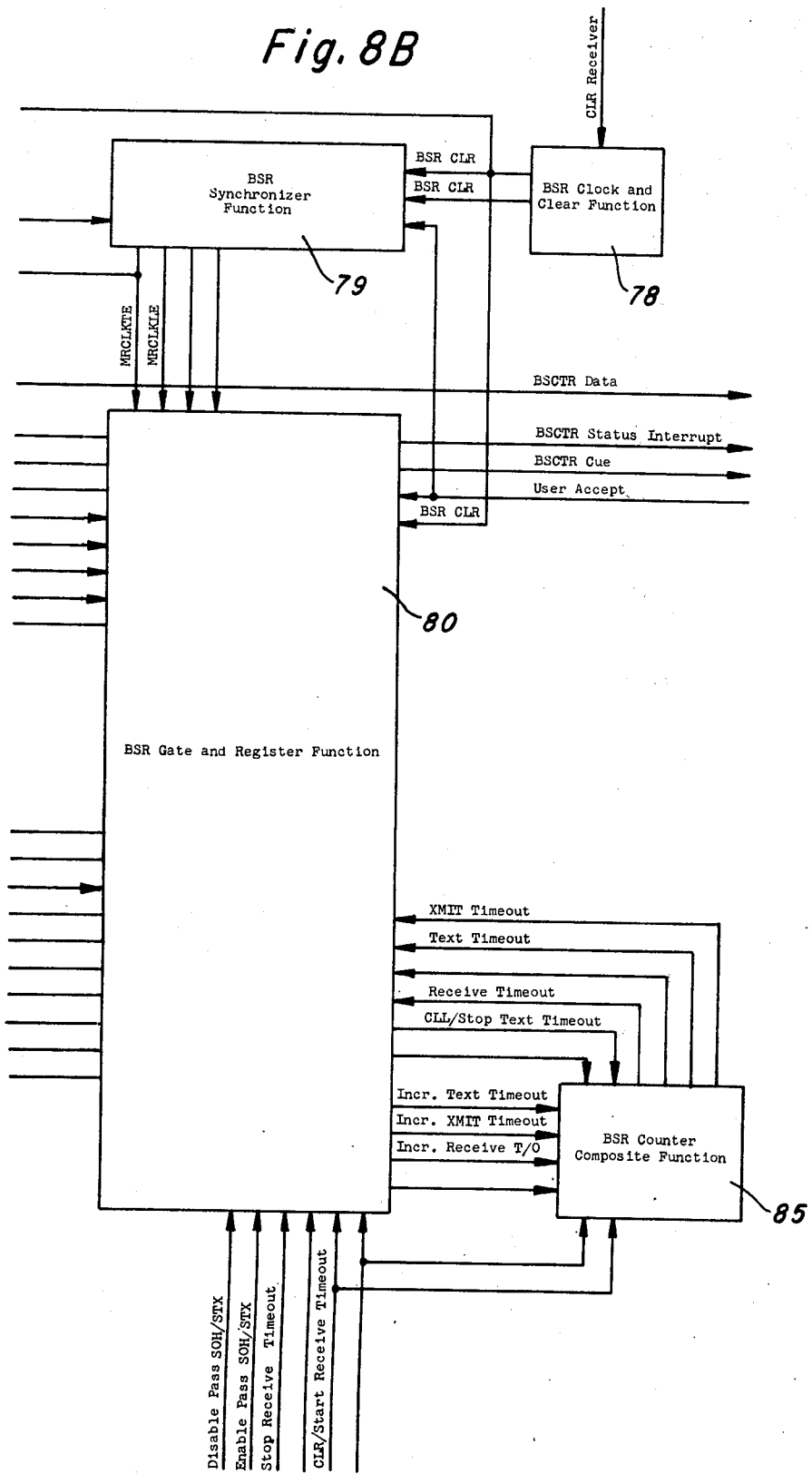
Figure 10:
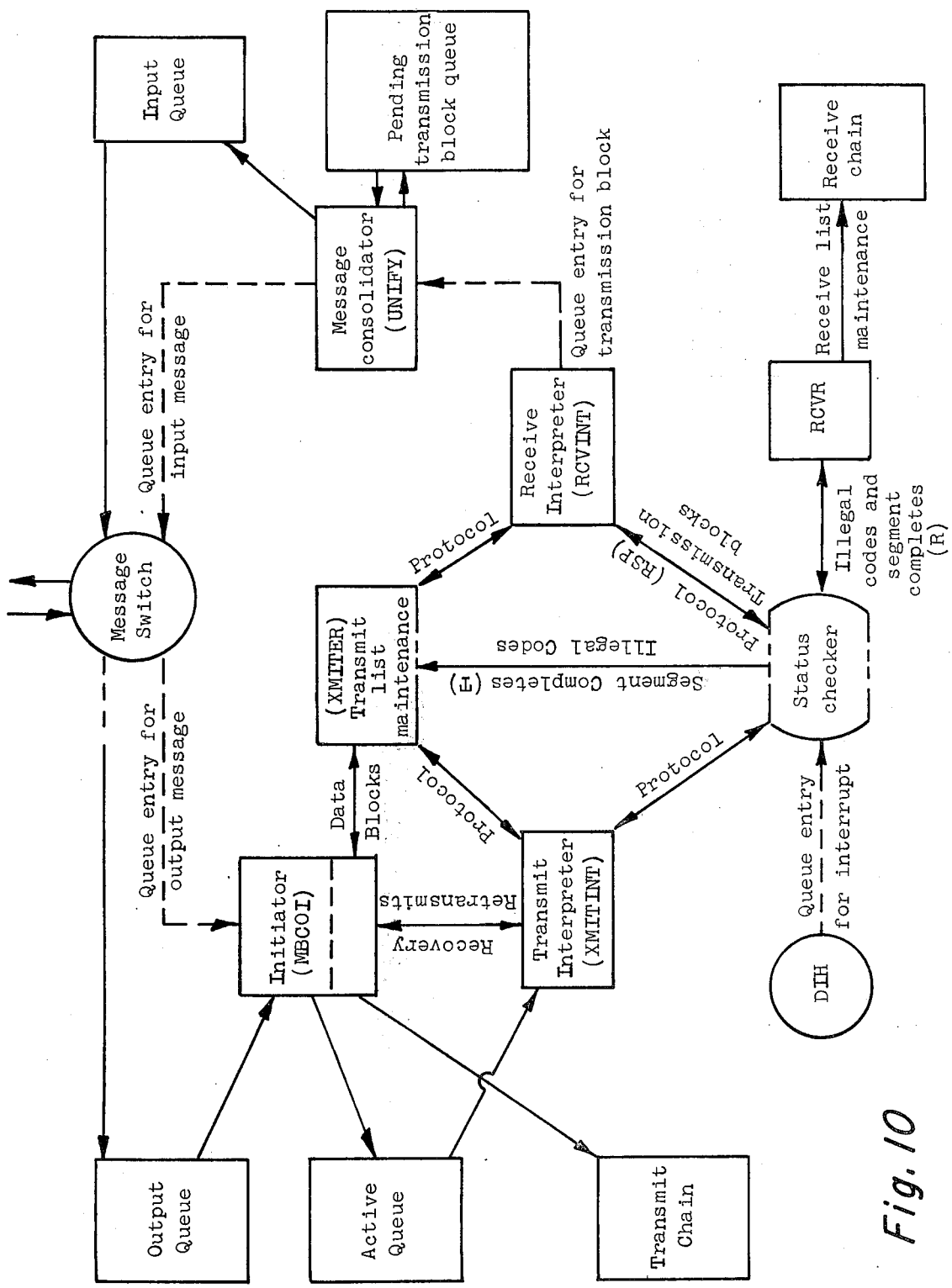
Figure 11:
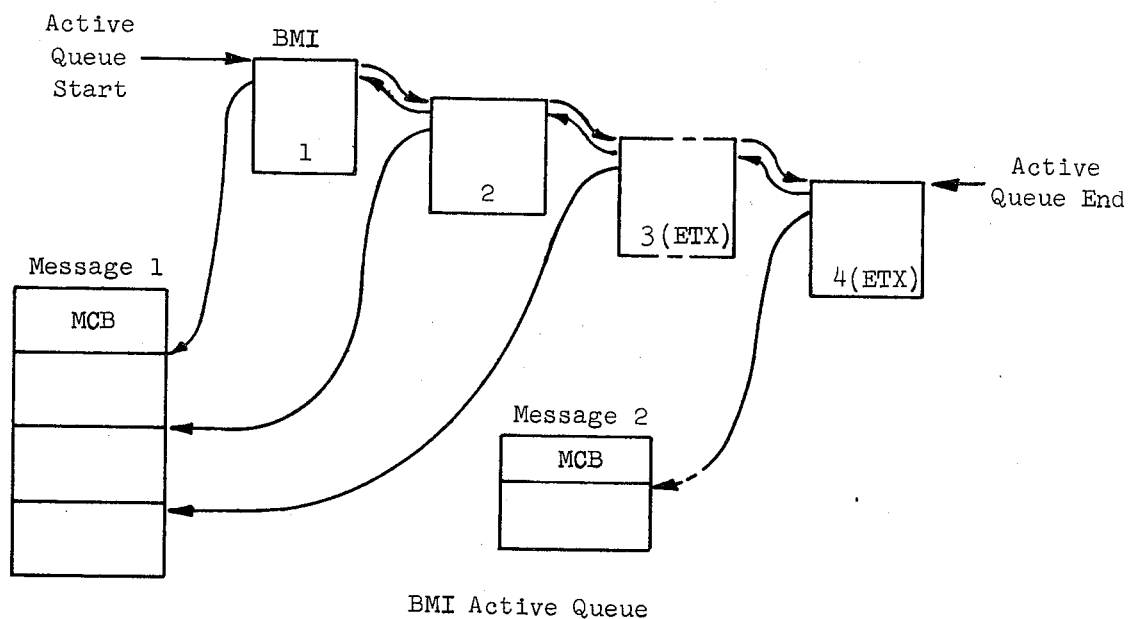
Figure 12:
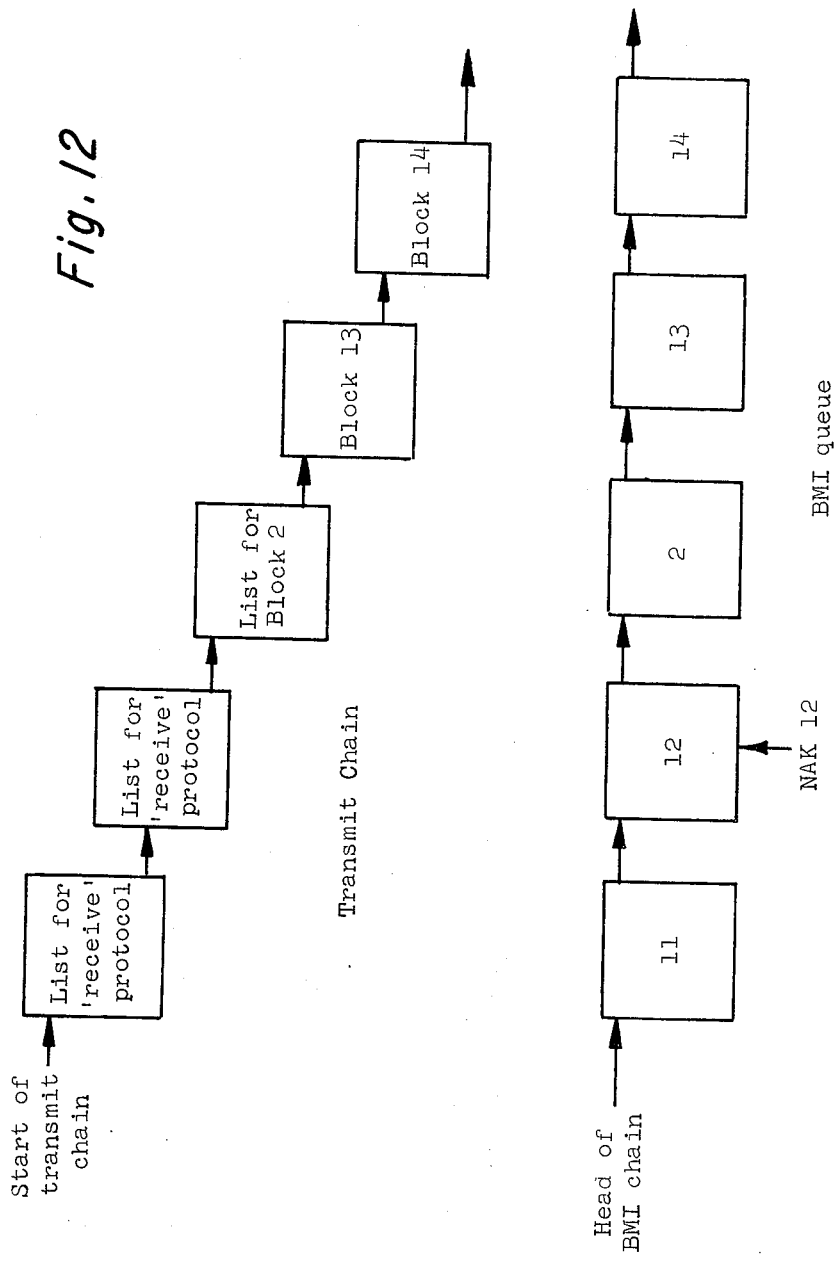

FIGS. 5 and 6 are detailed block diagrams of the data concentrator and computer interface unit 20 within the transmit/receive unit 15;

FIG. 7 is a block diagram of the transmitter portion of the transmitter/receiver 21 within the transmit/receive unit 15;

FIGS. 8A and 8B are a block diagram of the receiver portion of the transmitter/receiver 21 comprising the transmit/receive unit 15;

FIG. 9A is a block diagram of a logic circuit utilized in the transmitter to perform cyclic redundancy checking;

FIG. 9B is a block diagram of a logic circuit utilized in the receiver portion of the transmitter/receiver to perform the cyclic redundancy check;

FIG. 10 is a block diagram of the control software 13 utilized to simulate a hardware controller for the transmitter/receiver station in conjunction with the computer 12;

FIG. 11 is a block diagram illustrating the BMI active queue;

FIG. 12 is a block diagram illustrating an example of the BMI queue and transmit chain;

FIG. 13 is a block diagram illustrating the queue linkage prior to halt servicing; and FIG. 14 is a block diagram illustrating queue linkage after halt servicing is complete.

Figure 1:
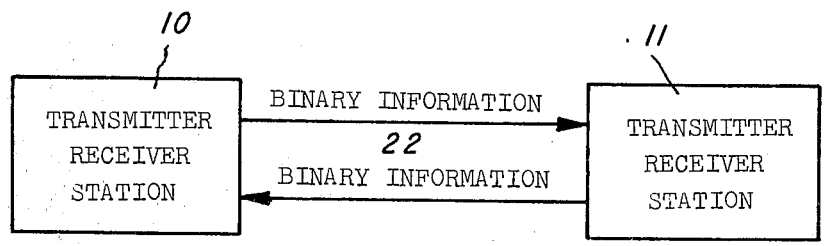
FIG. 1 is a block diagram of the multiple block binary synchronous duplex communications system according to the present invention.

Referring now to FIG. 1, the multiple block binary synchronous duplex communications protocol system of the present invention utilizes binary synchronous duplex communications procedure providing for synchronous transmission of binary coded data over full duplex lines 22. Two transmitter/receiver stations 10 and 11 are provided. The binary synchronous duplex communications system expands the transmission capabilities of present and future teleprocessing facilities through its abilities to support both half-duplex and full-duplex transmissions using a variety of codes. A transparency feature allows transmission of control characters in various forms of raw data within the normal message format without any associated control or graphic significance. The binary synchronous duplex system is also capable of accomodating a broad range of medium and high speed synchronous equipment.

The binary data in the binary synchronous duplex communications system is transmitted as a serial stream of binary digits. Synchronous communications in accordance with the present invention means that the active receiving station on a communications channel is operated in step with the transmitting station through the recognition of the specific bit pattern called the sync pattern at the beginning of each transmission.

The data link 22 consists of the communications lines, modems, and other communications equipment used in the full-duplex transmission of information between the two stations 10 and 11. Full-duplex communications permits simultaneous data transmissions from both stations 10 and 11. The communications facilities 22 may be, for example, lines provided by communications common carriers. The specific data set equipment used at each channel termination point or station is determined by the type of communications channel and the operational speed of the terminal equipment located at each station. The binary synchronous duplex system is intended, for example, for use on high quality voice grade channels and wide-band channels.

All transmissions are sent over the line as a sequence of binary-coded signals. Control of the data link 22 is accomplished by the transmission and recognition of special line-control characters. These control characters are known as data link control characters.

The major function of the binary synchronous duplex system is to effect the orderly transfer of data from one location to another using communications facilities.

The binary synchronous duplex system accomodates, for example, two specific transmission code sets. Each of these code sets consists of graphic characters (numeric, alphabetic, and special), functional characters (e.g., HT-horizontal tab., DEL-delete ), and data-link control characters (e.g., STX-start of text). Each code provides different capacities for total graphic and functional assignments. These capacities reflect the flexibility of the two codes EBCDIC (extended binary-coded decimal interchange code) and USASCII (United States of America standard code for information interchange). When either of these code sets is used with transparent mode, the flexibility of the telecommunications system is further increased since all possible bit configurations are treated as (data only) within transparent text. For this mode of operation, all assignment restrictions are removed from the code set being utilized. Thus, a parity bit is also available as a data bit when transmitting transparent USASCII coded data. This additional capability of binary synchronous duplex system means that within the standard message format any type of coded information can be handled using transparent-text mode. The system may also be adapted to handle additional sets of codes.

In accordance with the present invention, the multiple block synchronous duplex communications system is provided in which duplex data transmission is implemented with maximum efficiency. This is accomplished mainly in that error handling is optimized to effect nonstop transmission of data and nonduplication of valid data in the event of an error. The system may be implemented as a hardware embodiment or as a hardware/software embodiment.

Figure 2:
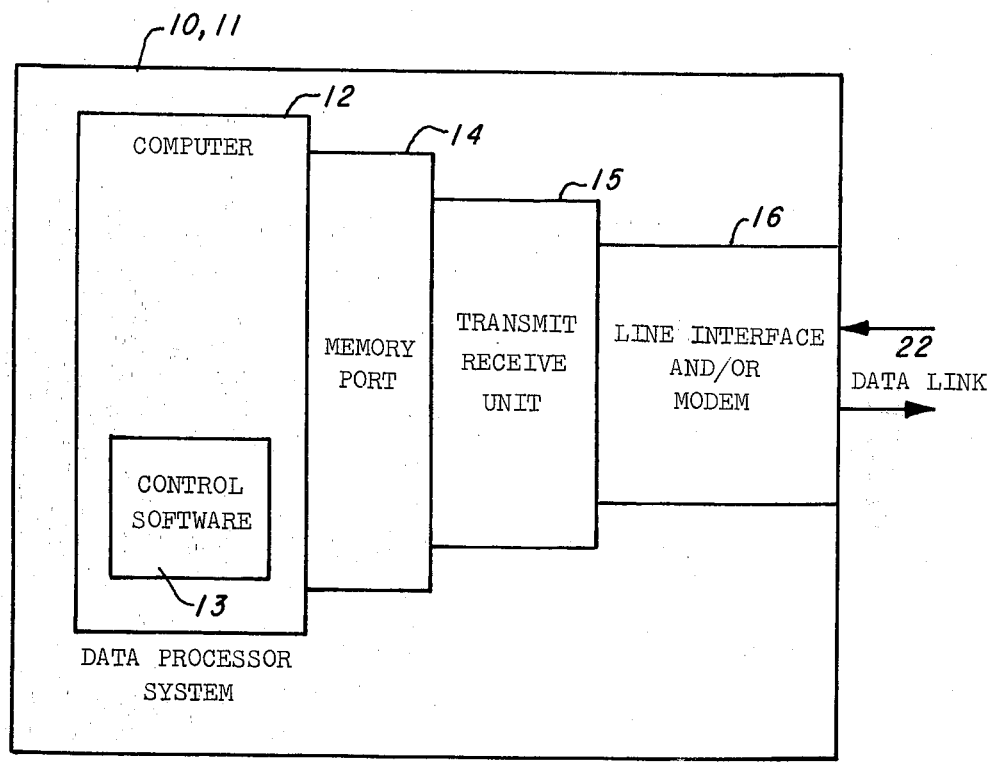
FIG. 2 is a block diagram of each of the transmitter/receiver stations 10 and 11.

Referring to FIG. 2, a combination hardware/software embodiment of the transmitter/receiver stations 10 and 11 is shown. In the systems according to this embodiment of the invention, each of the stations 10 and 11 is comprised of a data processing system or computer 12 including either hardwired or stored program software 13, a memory port 14, a transmit/receive unit 15, line interface and/or modem 16 and the data link 22 to the other similar station 10 or 11. Each station 10 and 11 is capable of transmitting and receiving control code sequences and data as henceforth will be described in detail.

Figure 3:
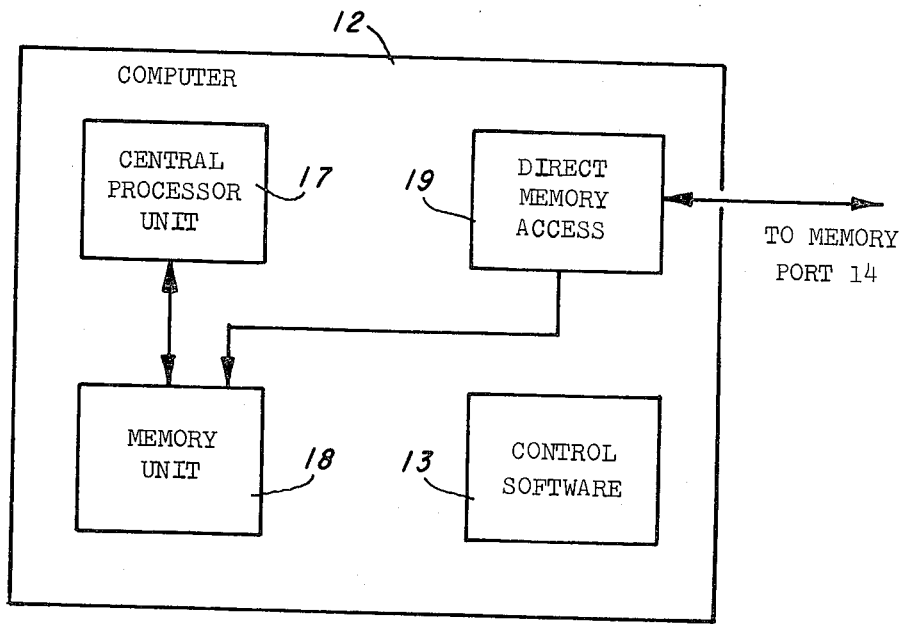
FIG. 3 is a block diagram of the computer which may be utilized in the transmitter/receiver stations 10 and 11.

Referring to FIG. 3, the computer 12 is a general purpose computer such as the 980A manufactured and sold by Texas Instruments Incorporated and is comprised of a central processor unit 17, and a memory unit 18. A direct address subsystem 19 built into the computer provides direct memory addressing via memory port 14 thereby allowing data to be stored under control of the transmit/receive unit 15. The computer 12 also includes hardwired or stored program control software which in the present embodiment controls to a major extent the operation of the communications system to effect the optimized error handling set forth above.

The communications system in accordance with the present invention may be implemented in existing commercially available systems such as the IBM 2701 or the communications system manufactured by Bolt, Berenek and Newman of Boston, Mass. by the addition of appropriate software which will later be discussed in detail. The system may also be implemented in accordance with the illustrated embodiment as set forth herein.

Figure 4:
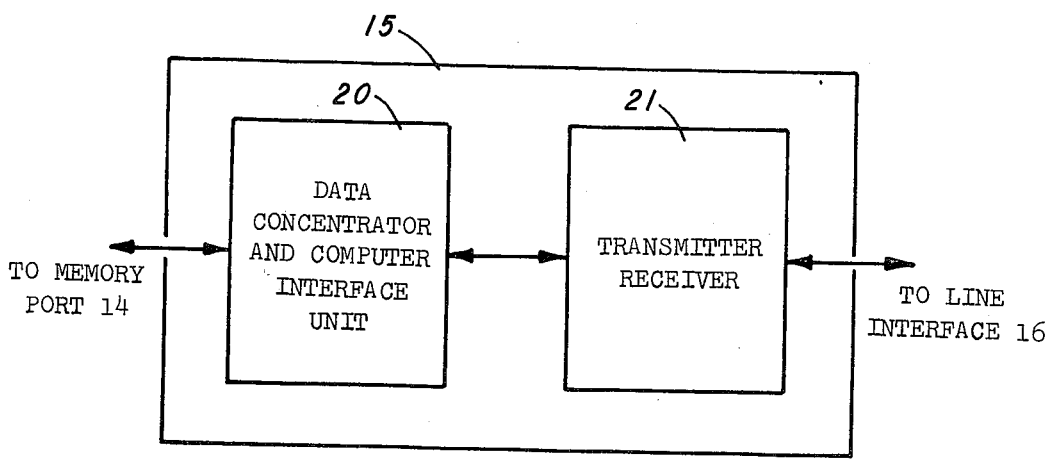
FIG. 4 is a block diagram of the transmit/receive unit which is utilized in the transmitter/receiver stations 10 and 11.

Referring now to FIG. 4, the transmit/receive unit 13 is comprised of a data concentrator computer interface unit 20 and transmitter/receiver 21. The computer interface unit 20 is coupled to the computer memory port 14 and the transmitter receiver is coupled to the line interface and/or modem 16.

The data concentrator and computer interface unit 20 matches the characteristics of the computer 12 to the characteristics of the transmitter/receiver 21. The data concentrator and computer interface unit 20 receives, acknowledges and stores in the computer memory unit each status word which comes from the transmitter/receiver 21. The unit 20 also receives, recognizes and acts upon commands from the computer 12. Each command is given, for example, in 16 bit words which instruct the unit 20 to perform one or more tasks such as: transferring a block of data from the transmitter/receiver 21 to the memory unit 18 by loading each word via memory port 14, acknowledging each word loaded, and storing the word in a specified location in the memory unit 18; transferring control words from the computer 12 to the transmitter/receiver 21 by fetching each word from memory unit 18, loading it and determining that the transmitter/receiver has acknowledged receipt of each word. The unit 20 is a half-duplex channel since it may either fetch a word from memory unit 18 or store a word in memory unit 18, but does not do both simultaneously. However, the unit 20 has the appearance of being a full-duplex channel because of its high speed of operation.

The operations of the data concentrator and computer interface unit are, with the exception of status interrupts and error condition interrupts, controlled by the computer control software 13 in the present embodiment. The unit 20 is a dual stored-program processor. Two chains of data concentrator and computer interface data/control transfer instructions are stored in the memory unit 18 by the control software 13, one for transmit transfers and one for receive transfers. A computer to data concentrator and control interface unit command, designated an ATI command, initiates the unit 20 with the memory unit 18 starting addresses of an instruction chain. The unit 20 then executes the instruction chain with no required further intervention of the central processor unit 17 of computer 12. In the event that the control software 13 has only a single hardware command word or status address word for the unit 20, the stored-program mode is unnecessary; a single word is transferred as the second of two words which constitutes an ATI command. Similarly, the second ATI command word may be used to convey a computer to transmitter/receiver or control word transmitted from the unit 20 to the transmitter/receiver 21. In the stored program mode, the second ATI command word is the memory starting address of the stored program.

The data concentrator and computer interface unit 20 is shown in greater detail in FIGS. 5 and 6. The systems of FIGS. 5 and 6 are implemented in hardware logic and controlled in accordance with the control software 13 residing in computer 12 as henceforth will be described in detail. Referring then to FIG. 5, a command controller 22 provides the store status or store registers to interrupt controller 23 through which the store status is transmitted to store controller 25. The interrupt controller 23 receives interrupt signals from the command controller 22, the logic function 24, the receive controller 26, and the receive DMA controller 29 and the transmit DMA controller 32 for segment complete. The interrupt controller 23 requests interrupts of the computer 12 and receives signals from the computer 12 when the interrupt is recognized. The store controller 25 controls the storing of data and transmits a store signal to the computer 12. The store controller also accepts "store receive data signals" from receive block transfer controller 28. The general logic function 24 transmits "request access signals" and receives "access granted" and parity error signals which are gated in the gate function 24 to request an interrupt of the interrupt controller 23. The receive DMA controller 29 requests interrupts of the interrupt controller 23 when segments are complete. The receive DMA controller 29 also sends "receive a data block" signals to receive block transfer controller 28 and fetch list signals to the fetch controller for the fetch controller to control a fetch from memory unit 18. The receive DMA controller 29 also sends "packed/unpacked mode control" to the data packer controller 27. The data packer controller 27 receives BSCTR queue signals from the transmitter/receiver 21 and BSCTR status interrupt signals from the transmitter/receiver 21. When the interrupt is accepted by data packer controller 27 an accept signal is returned to the transmitter/receiver 21. The received words packed or unpacked as controlled by receive DMA controller 29 are transmitted to receive controller 26 which requests a receive status interrupt of interrupt controller 23 and transmits received data to receive block transfer controller 28. The fetch controller 30 receives fetch list signals from both receive DMA controller 29 and transmit DMA controller 32. It also receives "fetch data signals" from transmit block transfer controller 31 and in response controls fetching of the lists or data from memory unit 18. The transmit DMA controller 32 requests interrupts of interrupt controller 23 when segments are complete. The transmit DMA controller 32 also signals the transmit controller 33 to transmit a list of data or control words. The transmit controller 33 transfers transmit words by data unpacker controller 34. The transmit DMA controller 32 also controls the packed/unpacked mode control of data packer controller 34. The data packer controller 34 sends queue signals and control signals to the transmit portion of the transmitter/receiver 21 and the transmitter/receiver 21 responds with an accept signal to the data unpacker controller 34. The transmit controller 33 also signals the transmit block transfer controller to transmit data words in response to which the transmit block transfer controller 31 requests "fetch data" from fetch controller 30.

Referring to FIG. 6, data read from memory is transmitted to the transmit register 35 and from the transmit register 35 to the number register 36, the receive R count register 38, the receive R start register 39, the transmit T count register 37, the transmit T start register 40, the receive address register input selector 42, the transmit T address register input selector 44, parity checker 51, or transmit buffer 52. The data received by the transmit buffer 52 is transferred to the data unpacker 53 and then to the function loop test 54. After the function loop test has been performed on the data, it is transmitted from the function loop test 54. The receive R address register input selector 42 also receives data from the R start register 39 and the transmit T address register input selector receives signals from the transmit T start register 40. The receive address register input selector 42 then feeds an address to the receive R address register 47 and the transmit T address register input selector 44 transmits addresses to the transmit T address register 48. The address in register 47 or 48 is then transmitted to memory address selector 49, or respectively chained by the receive chain register 41 loop to the receive R address register input selector 42 or the transmit T chain register 45 loop to the transmit T address register input selector 44. The status register 43 receives data from the transmit register 35 which is summed with the status count register 55 in adder 46 which is utilized by memory address selector 49 to select an address in accordance with the contents of the status register 43 and the status count register 55. An address selected by the memory address selector 49 is gated by address gating function 50 to provide a memory address to address the memory unit 18.

Received data is transmitted to the function loop test unit 54 and then to receiver buffer 55. First character latch 56 is set upon receipt of the first character and a signal is transmitted to receive buffer indicative thereof. The data is then transferred to the receive register. From the receive register the data is transferred to the memory write data selector and to the second and third status registers 59 and 60, respectively. The first status register 58 and the second and third status registers 59 and 60 transmit the receive status to memory write data multiplexer 61. The memory write data multiplexer 61 also receives the contents of the receive R address register 47, the receive R count register 38, the receive R start register 39, the receive R chain register 41, the transmit T address register 48, the transmit T count register 37, the transmit T start register 40, the transmit T chain register 45, the number register, the transmit register 35, the transmit buffer 52, the receive register 57, and the receive buffer 55. In accordance with these signals, the memory write data multiplexer 61 signals memory write data selector 62 to transfer the data from receive register 57 via data gating function 64 to write the data in memory unit 18. In addition, parity generator 63 generates a parity signal which is also transmitted to memory unit 18.

The transmitter function of transmitter/receiver 21 may be of the type shown in FIG. 7. Referring to FIG. 7, a transmit clock 72 is provided which feeds clock pulses to transmit synchronizer 73. The transmit synchronizer 73 synchronizes the transmit clock pulses from clock 72 and the modem transmit clock from the modem interface unit to the binary synchronous transmitter gate and register function 70 and counter composite 77.

The gate and register function 70 receives user data, user queue and user command words along with the synchronized clock and a bit count, time-out and sync count from the counter composite logic 77. Data is transmitted to the modem interface unit from the data register function 75. This data is transmitted from the gate and register function 70 to the data register function 75. The gate and register function also provides data register clock, parallel mode, SEL DLE, SEL SYN, SEL DATA, SEL S/R and CRC mode signals to the data register function 75. The gate and register function 70 also provides SOH, STX, ENQ, ETB, ETX, ITB, STICK, NAK, time-out and fill, stop on DLE and DLE signals to the transmitter state control function 74. When all states are present, the transmitter state controller function 74 returns a signal to the gate and register function 70. The gate and register function 70 also provides increment sync count, reset time-out and reset sync count signals to the counter composite function 77.

The data which is transmitted via data register function 75 is cycled to the transmit error function 76 to perform a cyclic redundancy check (CRC) when a CRC mode signal is present. The transmit error function 76 is described in further detail with respect to FIG. 9A. A transmitter command word function 71 also receives the user data and user command word and provides a stop on DLE signal to the gate and register function 70. The transmitter command word function 71 also provides text modem and send request signals to the modem interface unit 16. The transmitter command word function 71 also sends receiver clear, receiver start, unrecognized character, enable parity alarm, send status, stop receiver and pass SOH/STX signals to the receiver portion of the transmitter/receiver 21.

The receiver portion of the transmitter/receiver 21 may be of the type illustrated in FIGS. 8A and 8B. Referring to FIGS. 8A and 8B, the receiver is comprised of a binary synchronous receiver data register function 83 which receives data from the modem 16 and transfers buffered data to logic unit 82. The data is also circulated to the error function logic circuit 84 which provides the cyclic redundancy check on the received blocks of data. The error function logic 84 is described in further detail with respect to FIG. 9B. If there is an error this is indicated to the logic unit 82 by a "set error" condition signal. The receiver also includes a state controller function 81 which provides a plurality of logic states in accordance with control characters transmitted to the data register function 83 and from the data register function 83 to the state controller function 81. The logic states provided by the state controller function and the control characters are then applied to the gate and register function 80. The receiver also includes a clock function 78, a synchronizer function 79 and a counter composite function 85 providing functions similar to those of the corresponding unit in the transmitter portion of the transmitter/receiver.

The data link is designed to operate point-to-point (two stations). For point-to-point full-duplex operation, both stations (10 and 11 of FIG. 1) can use the communications lines 22 simultaneously. The operation of the system is as follows.

A transmission is comprised of one or more blocks of data. Its major subdivisions are called text blocks. Text blocks may in turn be subdivided into transmission blocks. A transmission block is divided into text blocks to facilitate data handling and buffer management in the transmitting and receiving stations. The text blocks may be further divided into transmission blocks to permit more efficient error control and higher data through-put rates than the text blocks provide. Data blocks are identified by a DLE STX (start of text) control character sequence immediately preceding each block. Each transmission block except the last is immediately followed by a DLE ETB (end of transmission block) control character sequence. The last transmission block of a text block is immediately followed by a DLE ETX (end of text) control character sequence. A maximum text block link is specified for each data link based on buffer memory considerations at both the transmitting and receiving stations.

Each block of data transmitted and the ACK (accepted, continue sending), NAK (data not accepted, e.g., a transmission error was detected) and RSP (retransmit) sequences are error-checked at the receiving station by the use of cyclic redundancy checking which checks the block after it is received. After each block, the receiving station will reply with an ACK control message if the cyclic redundancy checking is correct. If the cyclic redundancy checking is not correct, the receiving station transmits a NAK control message, which will cause the transmitting station to retransmit the data block. Retransmission of a data block following an initial NAK control message is attempted, for example, 3 times. The transmitting station receives no response message if the response message has a cyclic redundancy checking error, the transmitting station can request a retransmission of the response message by sending an RSP control message.

Cyclic redundancy checking is a method for error checking of blocks of data. The checking is a division performed by both the transmitting and receiving stations. The transmitter logic is illustrated in FIG. 9A and the Receiver logic is illustrated in FIG. 9B. The logic in both cases is implemented by shift registers and adders. In addition the Receiver logic includes an AND gate 102 to provide an error signal. Using the numeric binary value of the message as a dividend, division is performed using a constant divisor. The quotient is discarded and the remainder serves as the block check code BCC which is transmitted immediately following a checkpoint control sequence (DLE ITB, DLE ETB, or DLE ETX). The receiving station compares the transmitted remainder to its own computed remainder, and if they are equal, finds no error. The BCC accumulation is reset upon entering the text mode by the first DLE STX sequence or DLE SRP start of response sequence received when in the idle mode. The BCC accumulation comprises two bytes when it is transmitted on the line, but functionally is considered as a single sequence.

TABLE I

| MBSD CONTROL CHARACTER CODES | |
|---|---|
| CONTROL CHARACTER | HEX CODE |
| DLE STX | 10 02 |
| DLE ETX | 10 83 |
| DLE ITB | 10 1F |
| DLE ETB | 10 97 |
| DLE SRP | 10 08 |
| ACK | 86 |
| NAK | 15 |
| RSP | 85 |
| SYN | 16 |

An example of the hexadecimal code for the control characters of the multiple block binary synchronous duplex communications protocol system is shown in Table I. The division constant used in the binary synchronous duplex system is $2^{16} + 2^{15} + 2^2 + 1$. If the receiver finds that its communicated remainder is not equal to the transmitted remainder, it requests a retransmission of the block by replying with NAK control message or an RSP message. It continues retransmission until on some trial it obtains equality between the two remainders. The receiver then replys with a positive acknowledgement. If the number of retransmissions exceeds a preset maximum, three for example, an equipment failure is indicated.

The error control procedures utilized in accordance with the binary synchronous duplex system according to the present invention reduces the probability of accepting a block of data or response message with one or more transmission errors. Undetected block error probability and through-put rate can be optimized for different line error rates by adjusting the data block link. Each station adjusts its transmission link by utilizing DLE ITB or DLE ETB in order to optimize data link performance. An examination of the control character codes given in a Table I shows that two or more errors are required to transform one control character into another. A single error results in a garbled and, hence, detectable error pattern. The probability of an undetected control character error is approximately 4 times $P_0 2$, where $P_0$ equals the line error probability. The ACK, NAK and RSP control messages are sent utilizing a cyclic redundancy check and as such do not have the above problem.

Control of the data link is maintained through the use of the following control sequences and control messages: SYN (synchronous idle), DLE STX (start of text), DLE ITB (end of intermediate transmission block), DLE ETB (end of transmission block), DLE ETX (end of text), ACK (affirmative acknowledgement), NAK (message negative acknowledgement), RSP (message retransmit) ACK, NAK or RSP message, DLE SRP (start of response message) and DLE (data link escape).

The SYN synchronous idle is used to establish and maintain synchronization. Two contiguous SYN's at the start of each transmission are referred to as the character-phase sync pattern. During idle periods the all one's pad characters are transmitted rather than SYN. The DLE STX start of text character sequence precedes a block of text data. When in the idle mode, receipt of DLE STX initiates the text mode. The DLE ETB end of transmission block character sequence indicates the end of a block of text data started with DLE STX and causes a change to the idle mode. The blocking structure is not necessarily related to the processing format. The block check character is sent immediately following DLE ETB. DLE ETB requires an ACK or NAK response message from the receiving station. The DLE ITB end of intermediate transmission block character sequence is utilized to divide a text block for error checking purposes without requiring a reply. The block check character immediately follows the DLE ITB and resets the cyclic redundancy check accumulation. After each intermediate text bock, successive blocks begin with DLE STX.

Normal receiver reply occurs after the last intermediate block, which is terminated by DLE ETX or DLE ETB. One of these ending sequences is received, the receiving station responds to the entire set of intermediate blocks. If a cyclic redundancy check error is detected for any of the intermediate blocks, a NAK negative response is sent, which requires retransmission of all intermediate blocks. The DLE ETX end of text character sequence terminates a text block started with DLE STX or an ACK, NAK, or RSP message started with DLE SRP. The BCC is sent immediately following DLE ETX. DLE ETX requires a response message from the receiving station. This character sequence causes a change from text mode to idle mode following the BCC. An example of a one-way transmission of the multiple block binary synchrouous duplex protocol system in accordance with the present invention is given in Table II and III below.

Text block organization is described in Table IV. All text blocks begin with DLE STX. The next 16 bits is designated the sequence number. This number starts at zero ascending to $FFFF_{16}$. After the block sequence number $FFFF_{16}$, it is reset to zero. Text blocks end with the DLE ETX followed immediately by the two byte BCC. Transmission blocks within a text block end with DLE ETB. Intermediate transmission blocks end with the DLE ITB. DLE ETB and DLE ITB. DLE ETB and DLE ITB are immediately followed by the two byte BCC.

Table V shows the response message format. Response messages are utilized as status replys to trans-

TABLE II

ONE WAY EXAMPLE OF MBSD

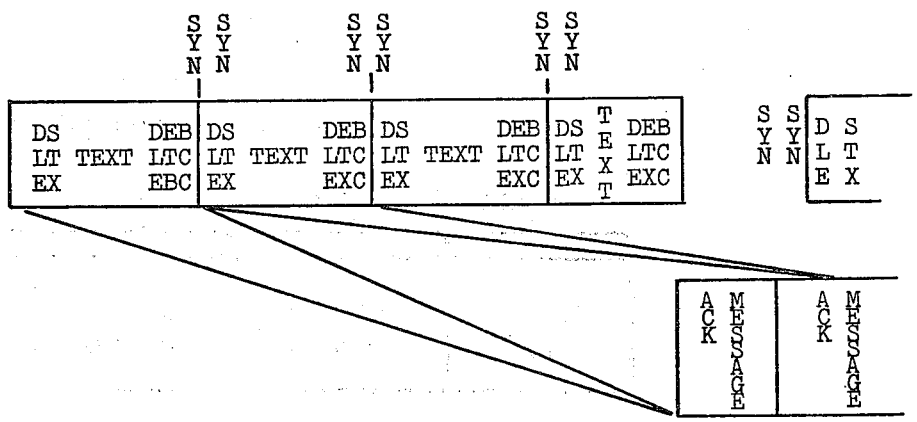

mission blocks (ACK, NAK) and to request retransmissions of ACK, NAK messages (RSP). All response messages begin with the DLE SRP character sequence. The next sixteen bits is the sequence number of the data block to which this response applies followed by the response character (ACK, NAK, RSP). Following the control sequence is the DLE ETX sequence followed by the BCC.

TABLE III

USE OF DLE ITB

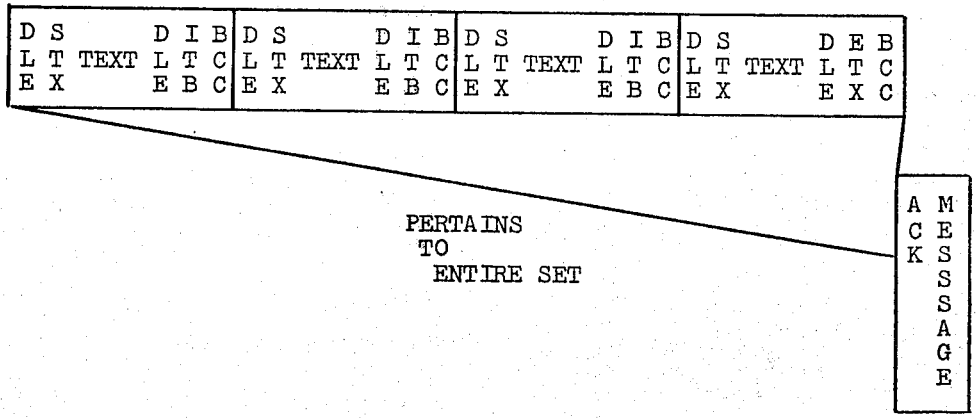

TABLE IV

TEXT BLOCK ORGANIZATION

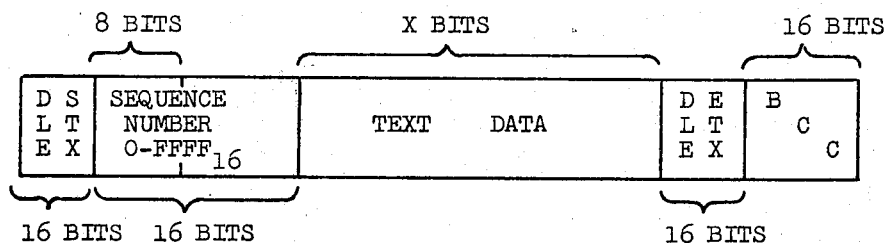

TABLE V

RESPONSE MESSAGE FORMAT

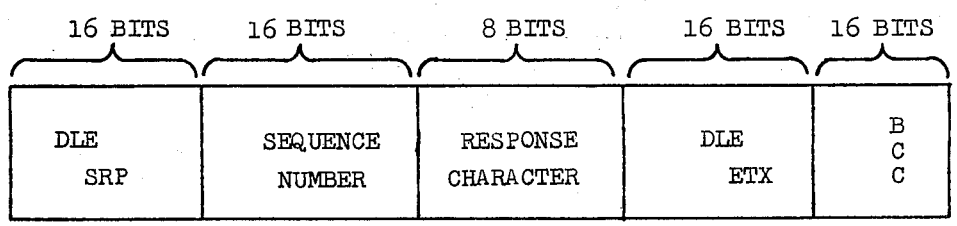

TABLE VI

ACK MESSAGE EXAMPLE

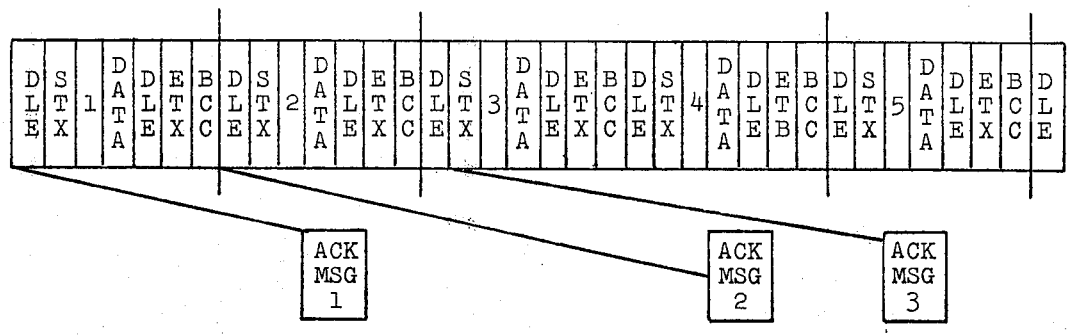

An example of an ACK message sequence is given in Table VI, an example of a NAK message is given in Table VII and an example of an RSP message sequence is given in Table VIII.

The DLE SYN control code sequence is used to verify sync or as a time-fill sequence within a transmission block. A DLE ENQ control code sequence is used to abort a transmission block. A DLE DLE control code sequence is used to permit transmission of DLE as data when the bit pattern equivalent to DLE appears within a transmission block. The first DLE is disregarded and the other is treated as data. A DLE ITB control code sequence indicates the end of an intermediate block and a DLE SRP control sequence indicates the start of a response. The DLE STX following an intermediate block may be preceded by SYN SYN. The SYN SYN control code sequence is not included in the BCC.

Transparent data and responses are received on a character-by-character basis such that character phase is maintained.

Control character inclusion in the BCC is as follows: DLE is included if it is preceded by DLE. The first DLE which was inserted by the transmitting station is not included. Both characters of a DLE STX sequence following an ITB are included. DLE is not included except for the preceding two conditions. STX and SRP are not included except for the second condition for STX. ETB, ITB and ETX are always included. SYN is included only if it is within a response or text block and not preceded by DLE. Sequence numbers are included in the BCC. SYN characters sent outside the text or response blocks do not require a preceding DLE.

In accordance with the present invention, effective use of long-delay, full-duplex data links, through the multiple block binary synchronous duplex procedures, requires the proper use of the data link control sequences.

TABLE VII

NAK MESSAGE EXAMPLE

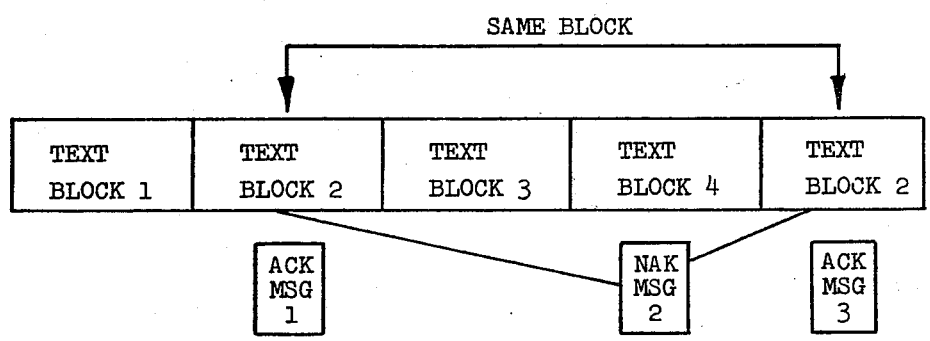

TABLE VIII
RSP MESSAGE EXAMPLE

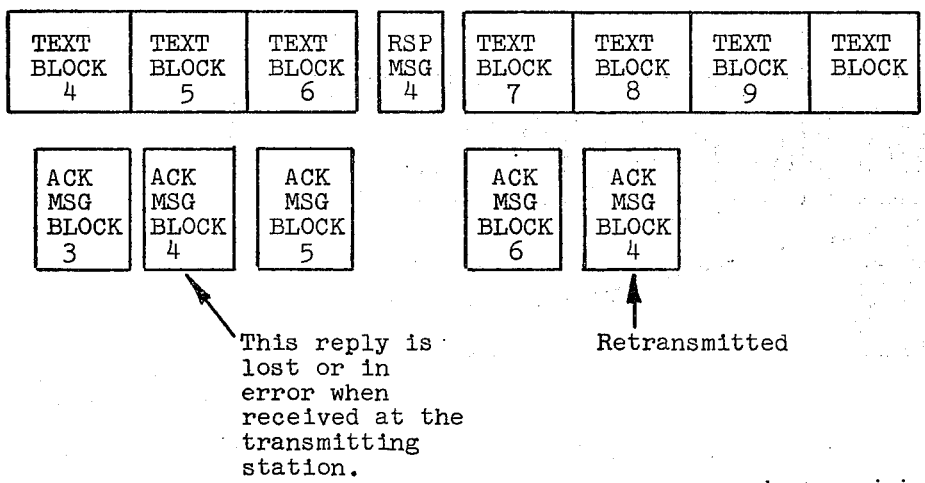

Effective communications are obtained by transmitting multiple data blocks in both directions before waiting for responses and by interleaving data blocks and response messages. Time-outs are defined to prevent indefinite delays due to formating errors or hardware malfunctions. The multiple block binary synchronous duplex communications system also provides synchronization formats because of the bit serial nature of common carrier transmissions. Long-delay data links are defined as those which have long delays between the time data is transmitted and the time response for the data is received. Several things can cause this delay, including long propagation times such as satellite transmissions and long processing delays at the receiving station. The system according to the present invention overcomes these problems by transmitting enough data to fill the entire memory of the data link where "memory" is defined as the amount of data which can be transmitted in the round-trip delay time. The round-trip delay time is equal to the round-trip propagation time plus processing time at the receiving station needed to return a response.

To begin a transmission, the transmitter begins transmitting when it has data to send. No line bid sequence is necessary as it is assumed that the receiving station is always ready to receive. Time-outs and response messages will eventually bring the two stations in sync should the receiver not be ready to receive. Idle periods are periodically filled with data blocks having zero data bits as will hence forth be described in detail.

Under the above procedure, the transmitter may transmit as much data as it has buffer without receiving a response. To make maximum usage of the data link, this amount of buffer should be equal to or greater than the memory of the data link. This may necessitate having more buffer in the receiving station depending on how buffers are managed because of short data blocks. As a receiving station receives each data block, the BCC and sequence number are checked. If the BCC matches and the sequence number is one greater than the last received (except after reset) the receiver transmits an ACK response message with the same block sequence number. If the BCC is incorrect, the receiver transmits a NAK response message with expected block sequence number and increments the last received sequence number. If the BCC is correct, but the sequence number is different than expected, the receiving station has three alternatives. If the sequence number is behind the expected sequence number and it is an expected retransmission, the receiver transmits an ACK message with the retransmitted block sequence number and does not increment the last received block sequence number. If the block sequence number is higher than that expected, but lower than some arbitrary number, the receiver assumes that all blocks in between were lost and sends a NAK message for each and sends an ACK message for this data block updating the last received block sequence number to the received block sequence number. If the sequence number is higher than expected by more than the arbitrary number or is lower and not a retransmission it is assumed that the sequence number is in error and the block is discarded. When the transmitter receives a correct ACK message, it assumes that the data block with the matching block sequence number was received correctly and that the buffer can be used for other blocks. When a NAK message is received, the transmitting station must retransmit the data block.

If a reply to a data block is in error (wrong sequence number, incorrect BCC, or never received such as a receive time-out), the transmitter replys with an RSP message to obtain a retransmission of the expected response message or messages. If the BCC is incorrect, the transmitter transmits an RSP message for the expected response using the expected sequence number and increments the expected number. An example of a correct BCC and sequence number is given in Table IX. If the BCC is correct, but the sequence number is different than expected the transmitter has three alternatives. If the sequence number is behind that expected, and this is an expected retransmitted response, the transmitter accepts it for that block. If it is not an expected transmitted response and it is behind the expected sequence number and is not an RSP, it is ignored. If the sequence number is more than some arbitrary number above the expected sequence number (expectance window) an RSP is sent for the sequence number. If it is within the expectance window, RSP messages are sent for intervening responses and the time-outs are restored. Receive time-outs cause recovery for missed responses.

RSP messages are different in that the sequence comparison is done on the sequence number of the last received data block. For sequence numbers lower than the last received by less than $2^{15}$, with a NAK outstanding for the sequence number, the NAK message is retransmitted. If the NAK is not outstanding for this block, and an ACK for that sequence number is transmitted since it is assumed that this block has been previously accepted.

block (ETB ETX) and the start of a block. Response messages are not sent between intermediate text

TABLE IX
EXAMPLE OF CORRECT BCC AND SEQUENCE NUMBER

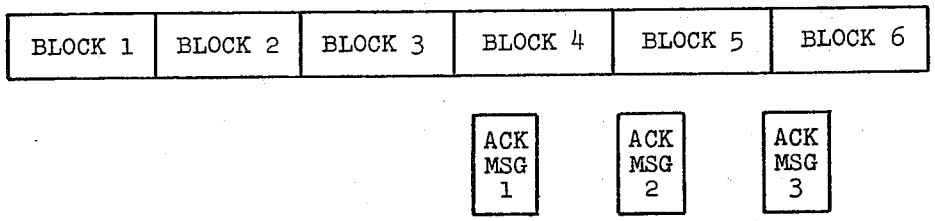

TABLE X
EXAMPLE OF NAK RESPONSE MESSAGE AND LOW SEQUENCE

SAME BLOCK

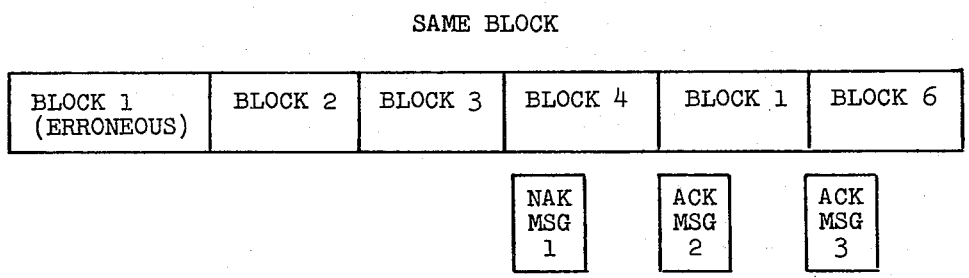

TABLE XI
EXAMPLE OF MISUNDERSTOOD ACK

DISCARDED

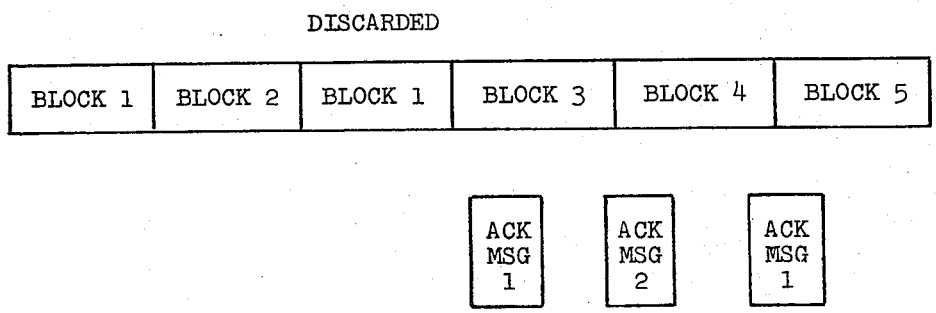

If the sequence number is ahead of the last received but within the expectance window, a NAK message is sent for that block assuming that it was missed. Others are ignored. An example of a NAK response message and low sequence is shown in Table X. An example of a misunderstood ACK message is shown in Table XI. An example of high sequence number is shown in Table XII.

The examples given so far have shown data being transmitted in one direction and response transmitted in the other direction. The multiple block binary synchronous duplex communications system in accordance with the present invention is intended for data and response traffic in both directions to provide the completely full-duplex with response messages being sent between data blocks; that is, between the end of a blocks. Because the multiple block binary synchronous duplex communications system is bilaterally symmetric, the example shown in the tables above are for one data side of the line with the other side looking identical except for time phasing. In Table XIII full-duplex operation is indicated.

To provide and monitor for the maintenance of the in-sync condition during an entire transmission, additional sync patterns are inserted in the text data by the transmitter. The sync pattern is automatically inserted at one second intervals. Since all texts are transmitted in transparent mode, SYN inserted in this manner must be preceded by DLE in order to be recognized. The DLE SYN's are not included in the BCC accumulation, and are stripped from the message at the receiving station.

TABLE XII
EXAMPLE OF HIGH SEQUENCE NUMBER MISSED BY RECEIVER

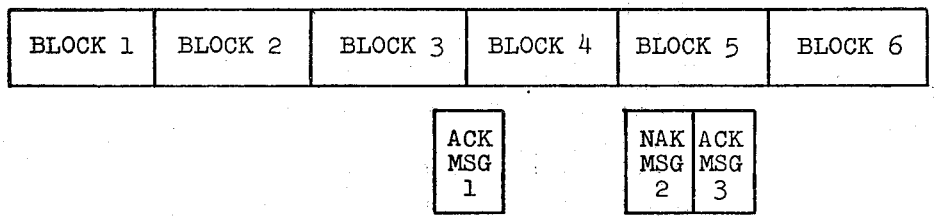

TABLE III
FULL DUPLEX MBSD OPERATION

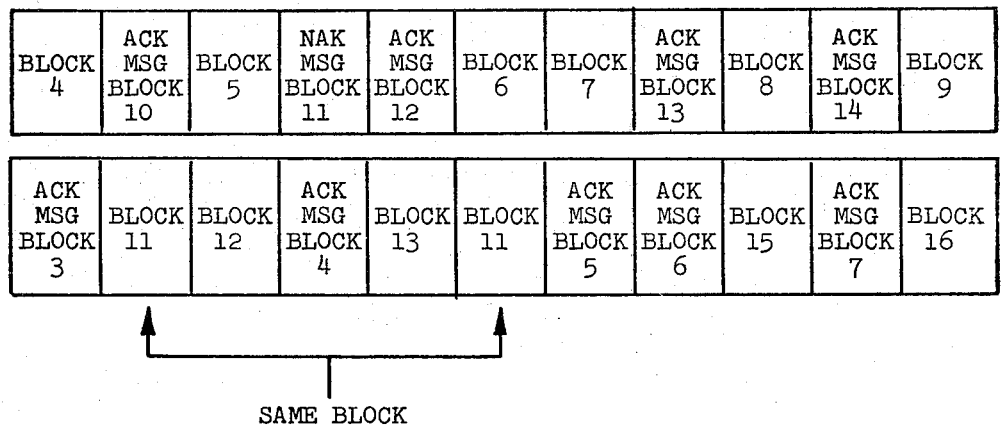

Time-outs are used to prevent indefinite data link tie-ups due to false sequences or missed replies by providing a fixed time within which any particular operation must occur. Three time-outs are provided in the present embodiment: transmit, receive and data. The transmit time-out is a nominal one second time-out that is established as the rate at which DLE SYN is inserted into transmitted text data. One transparent DLE SYN sequence is inserted every second. DLE SYN's are inserted for timing purposes, and have no effect on the message format. If this time-out should occur, the receiver transmits a NAK or RSP message for this block. Receive time-out is a nominal three-second time-out, for example, and limits the waiting tolerated for transmitting station to receive a reply to an ETB or ETX or an RSP message. When this time-out occurs, an RSP message is sent for the next response expected. This time-out is started for each response expected. time-out is a nominal two-second time-out, for example, which is in effect during periods when no text is available to be transmitted. It is required that the transmitting stations send a text block with zero data bits and with the proper sequence number. The receiving station will respond to the block as it would any other data block. This time-out is to assure the transmitting station that the receiving station is operable during idle periods. All 1 paired characters are sent at other idle periods.

In accordance with the present invention, when the transmitter has data to send, the transmitter immediately sends the data expecting the receiver to be ready to receive. The transmitter continues sending data as long as data is available to be sent. The transmitter retains the data it has transmitted until a positive acknowledgement for the data has been received.

An overview of the communications handler sofeware is shown in FIG. 10. The handler consists of seven segments: transmit initiator (MBCOI) 21 (Table RII); transmit chain maintenance (XMITER) 22 (Table RIV); status interpreter (STATUS) 23 (Table RI); transmit interpreter (XMTINT) 24 (Table RV); receive chain maintenance (RCVR) 25 (Table RVI); receive interpreter (RCVINT) 26 (Table RVII); and message consolidator (UNIFY) 27 (Table RVIII).

These segments utilize the following queues: an output queue; an active queue (BMI); a transmit chain; a receive chain; a pending transmission block queue; an input queue; a NAK list; a pending protocol chain; and a pending BMI queue.

When Message Switch receives a message to be output, Message Switch places the message on the output queue and makes a queue entry for the transmit initiator Table RII. When the transmit initiator gets execution, the message is assigned a communications sequence number and XMITER Table RIV is called to put the message on the transmit chain. The initiator then takes the message off the output queue and makes an entry for the message of the active queue. The initiator does the above operation each time it gains execution because of a Message Switch queue entry.

When a response for a message is received, control is passed to the transmit interpreter Table RV.

TABLE R-I
TABLE R-I (continued)
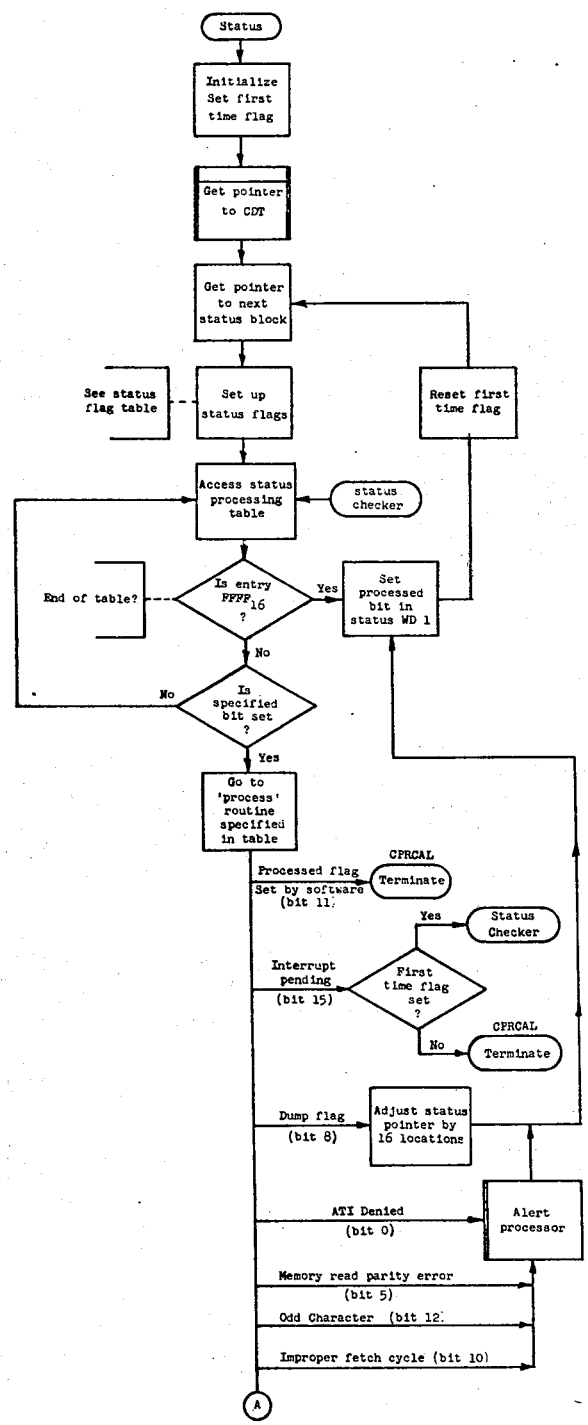
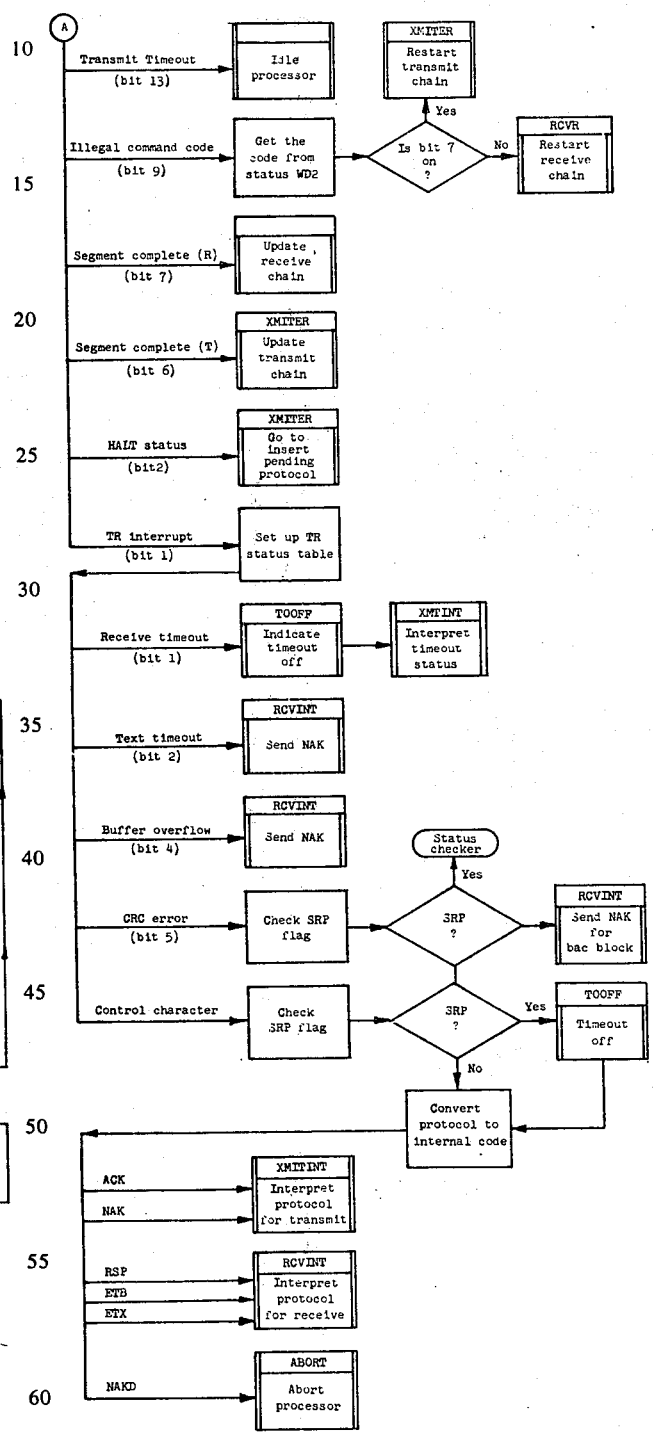

TABLE R-II
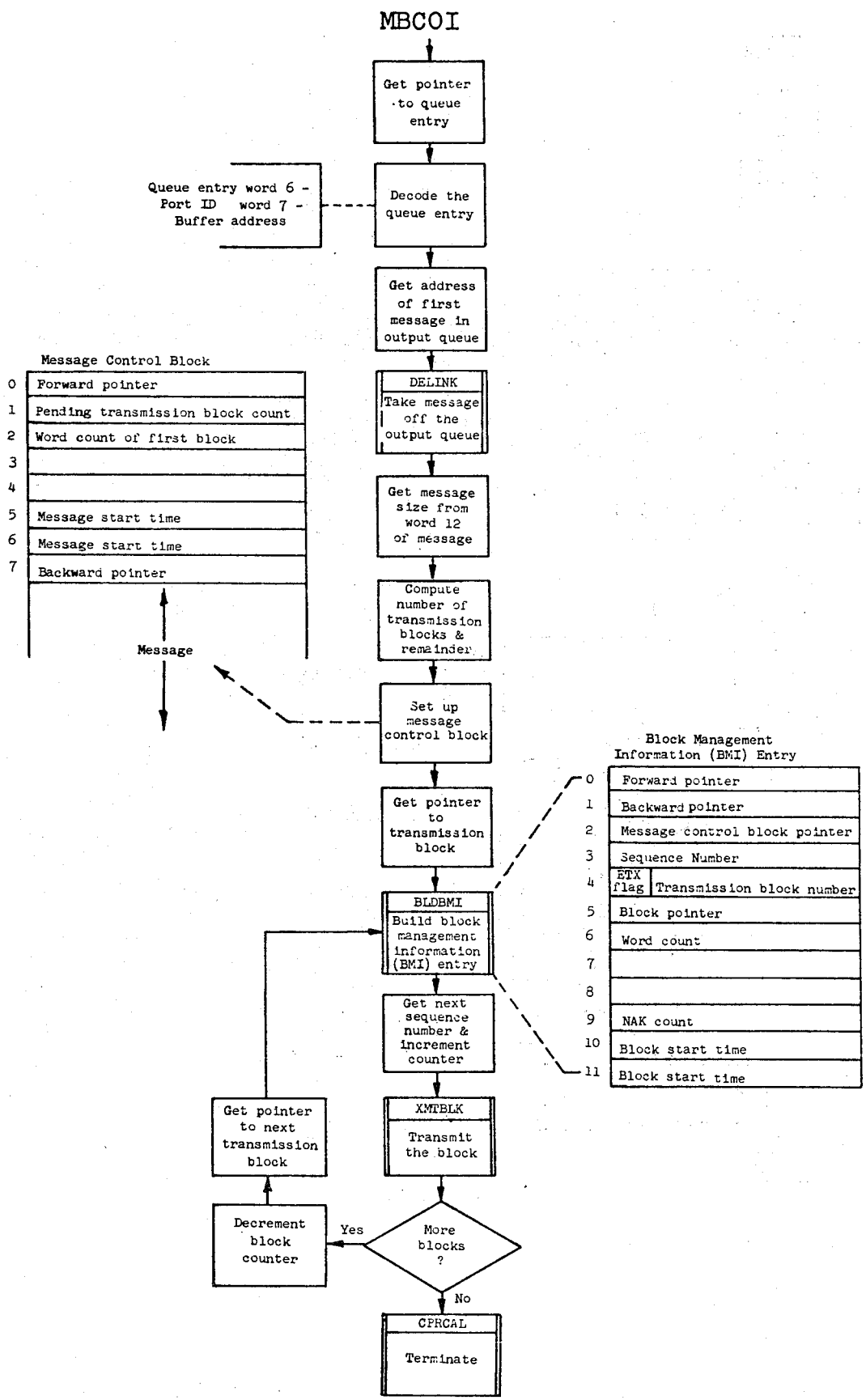

TABLE R-III
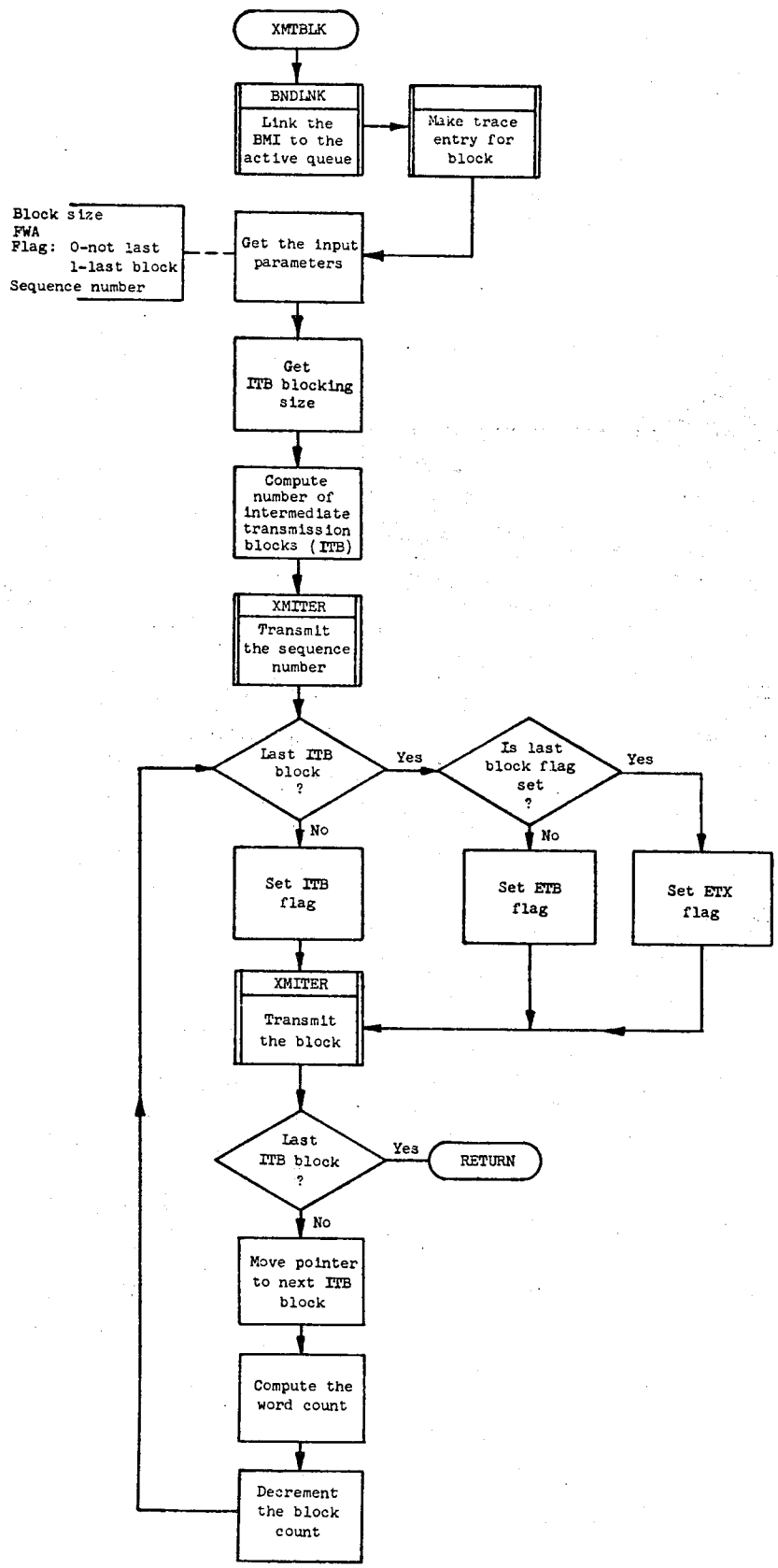

TABLE R-IV
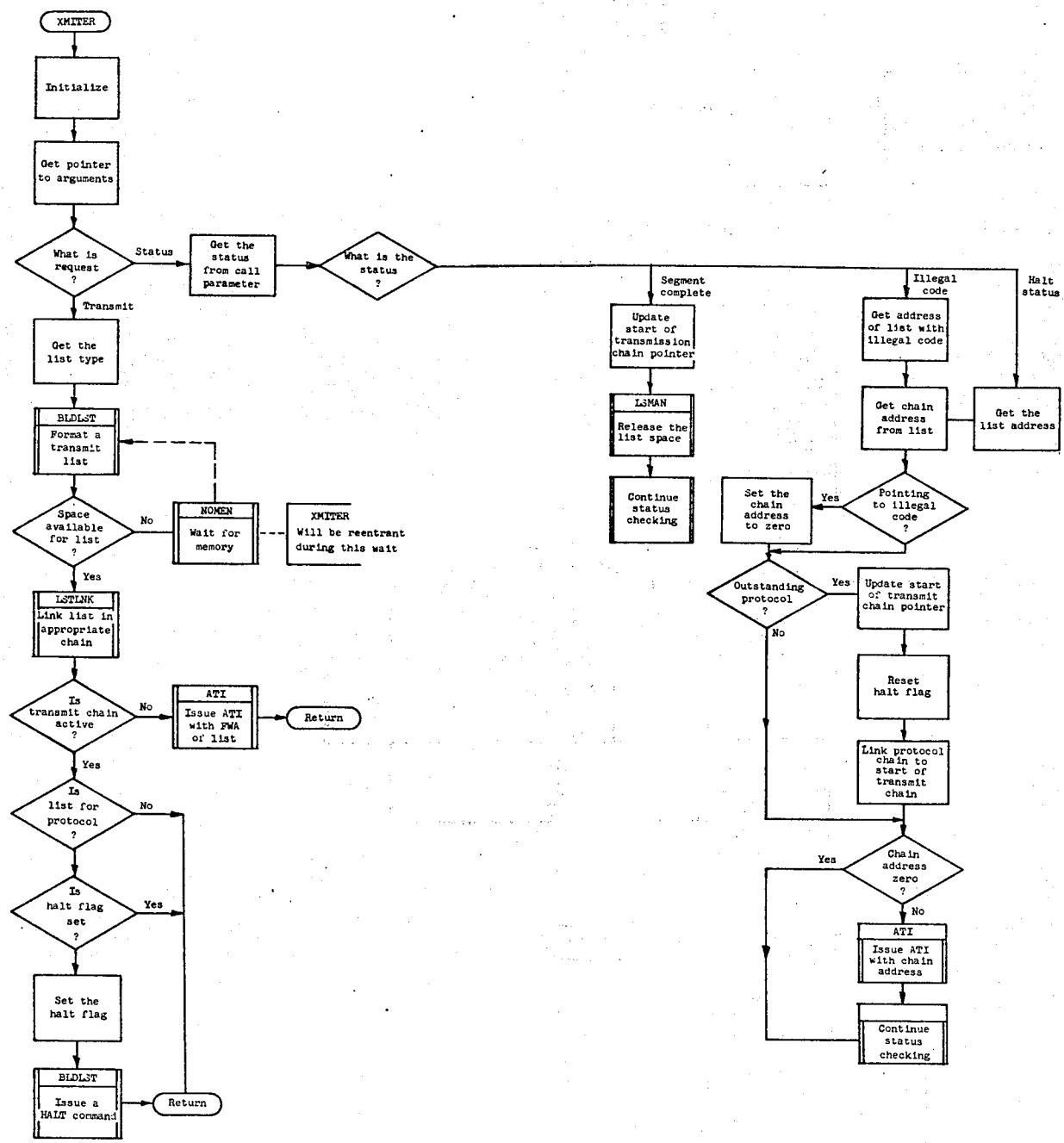

TABLE R-V
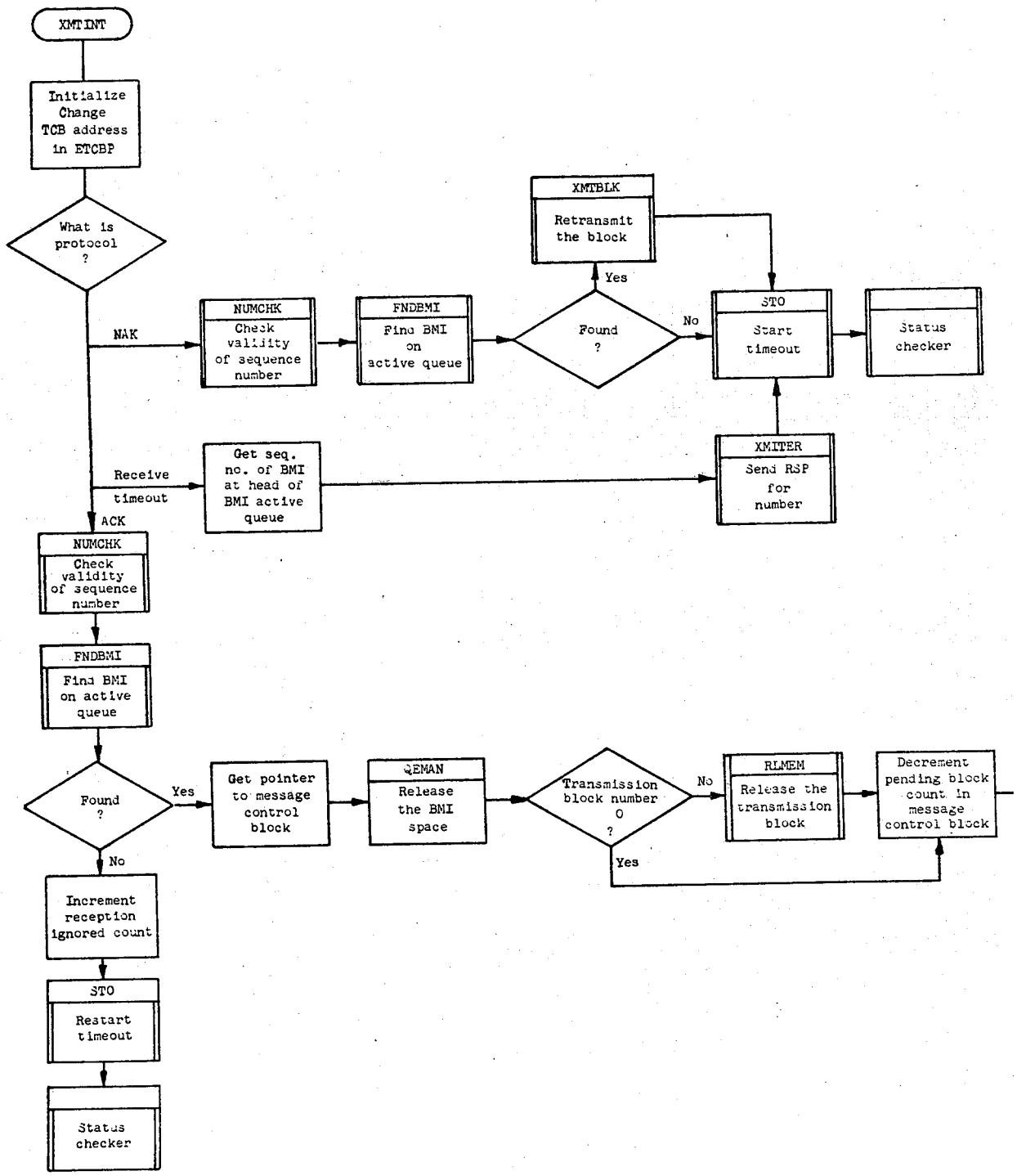

TABLE R-V (continued)
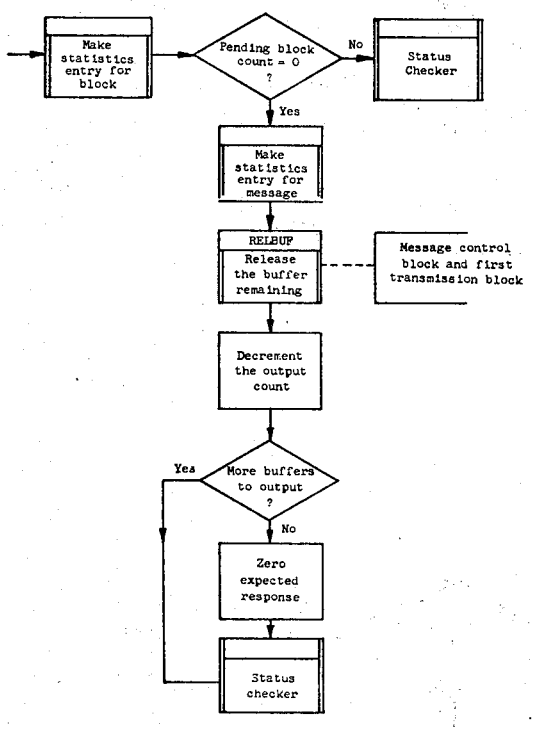
TABLE R-VI
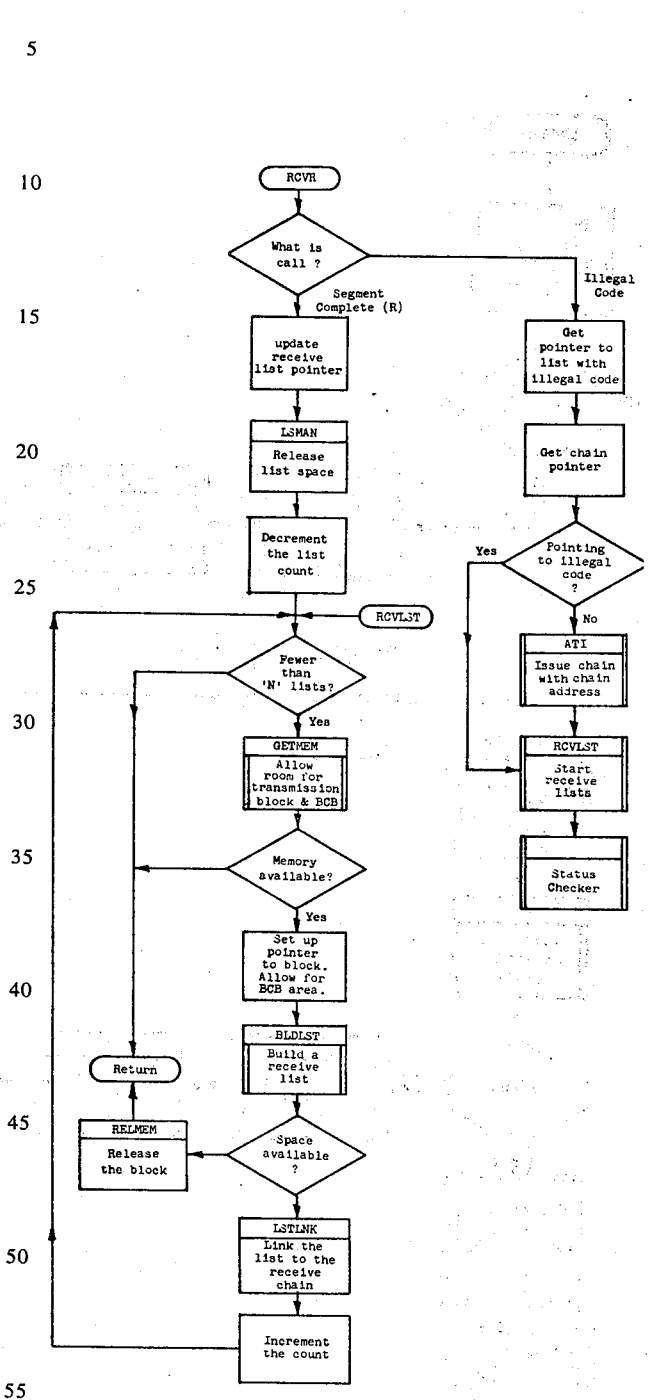

TABLE R-VII
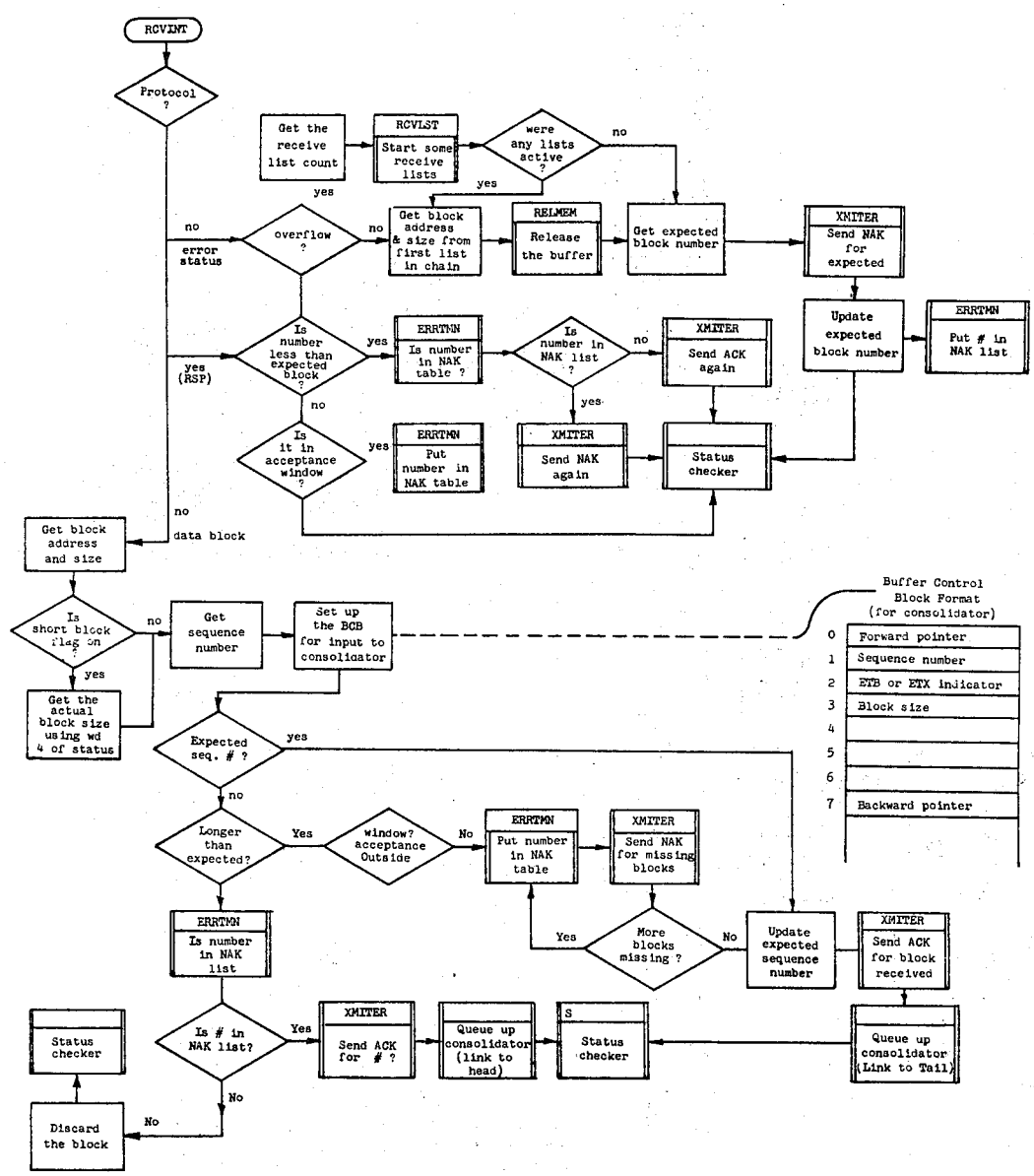

TABLE R-VIII
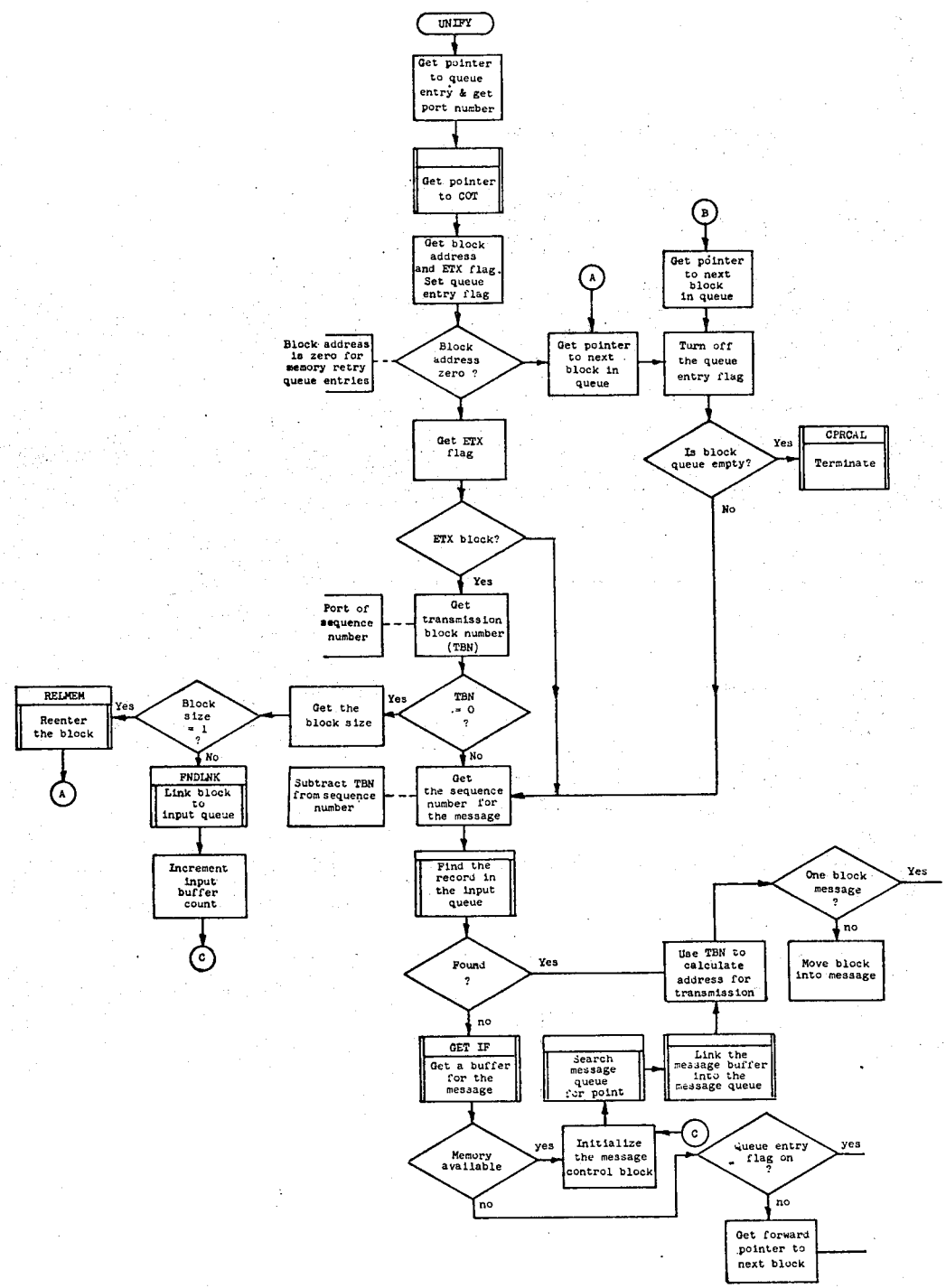

TABLE R-VIII
(continued)
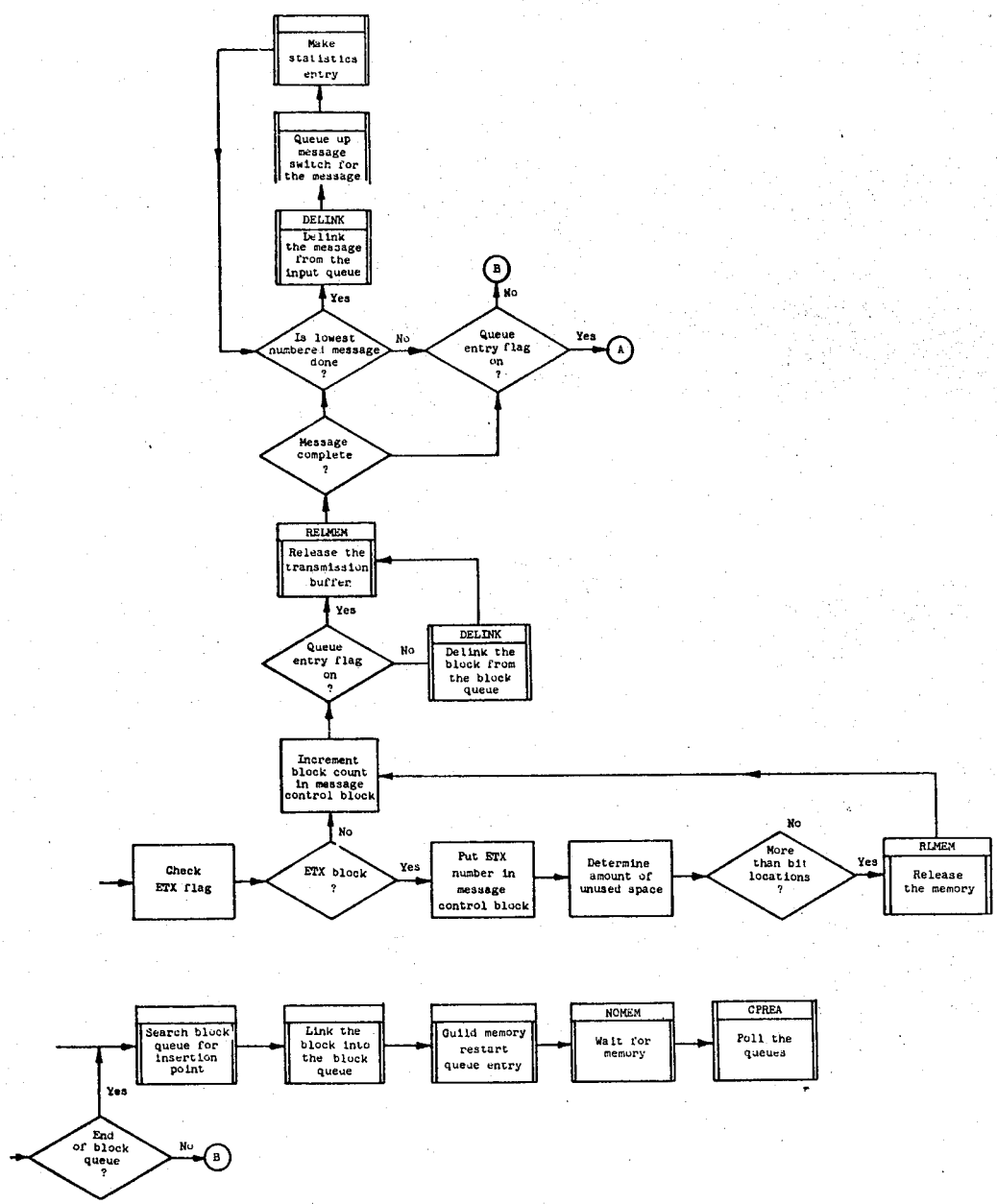

The message referenced by the response is found on the active queue and is either released to free memory (in the case of an ACK) or is retransmitted (in the case of a NAK).

The receiver chain maintenance routine keeps receive lists running waiting for a message. When a message is received, control is passed to the receive interpreter Table R-VII which queues up the message consolidator and sends a response. The messages are sent as a set of transmission blocks. These transmission blocks are received into noncontiguous memory locations. The message consolidator Table RVIII moves the transmission blocks into a block of memory and places the transmission blocks in the proper order. The message is then placed on the handler input queue and Message Switch is queued up.

The handler services several ports. Each port has a set of port tables. The contents of the tables are shown in Tables S-I, S-II and S-III. Auxilliary space 1 Table S-II contains the queue pointers for the handler, and auxilliary space 2 Table S-III contains statistics for the port. The port status is maintained in the Port Data Table S-I.

The handler structure is described by the following. The status interpreter makes use of three tables to determine what action to take while checking the status. The CI status is shown in Table S-IV and the TR status is shown in S-V. The status interpreter uses the Status Process Table S-VI to determine the order in which the status bits are to be checked and what action should be taken if the bit is on. This routine is flow-charted in Table R-I of the flowcharts. The status interpreter checks the status bits in the order in which the bits occur in the Status Process Table S-VI.

Some bits in the status are used as flags to the interpreter. The status flag Table S-VII is used to set the appropriate flags.

PORT DATA TABLE S - I

Status Flags
Reserved
Input (Status Interpreter) TCB address
Output (Initiator) TCB address
Maximum message size
Transmission blocking size
Intermediate transmission blocking size
Output buffer limit
Number of output buffers assigned
Output queue start
Output queue end
Input buffer limit
Number of input buffers assigned
Input queue start
Input queue end
Number of status blocks
Address of first status block
Address of last status block checked
Address of last status block
Next sequence number to send
Expected response number
Acceptance window
Next sequence number expected
Halt flag (bit 0)/error limit for abort
Address of auxiliary space 1
Address of auxiliary space 2
Start Address, ASC input data message queue
End address, ASC input data messaga queuq
Start address, ASC output data message queue
End address, ASC output data message queue

AUXILIARY SPACE 1 TABLE S - II

Transmit Chain Start
Transmit Chain End
Transmit recovery queue start
Transmit recovery queue end
Pending protocol chain start
Pending protocol chain end
Active block queue start
Active block queue end
Receive chain start
Receive chain end
Received block queue start
Received block queue end
NAK list start
NAK list end
Number of timeouts without a valid response
Number of NAK's sent without a valid block AUXILIARY SPACE 2 TABLE S - III
Number of RSP's pending
Number of blocks pending on ACK
Total NAK's received
Total NAK's sent
Number of NAK's pending
Number of RSP's received
Total timeouts
Total text timeouts
Total overflows
Total CRC or parity errors

TABLE S - IV

| | | CSCI STATUS | | |
|---|---|---|---|---|
| WORD 1 BIT | 0 | ATI Denied | A (*) | (1) |
| | 1 | CSTR Interrupt | (*) | |
| | 2 | CSCI Halted for Relinking | (*) | (2) |
| | 3 | Receiving Text | | |
| | 4 | Sending Text | | |
| | 5 | Memory Read Parity Error A | (*, ) | |
| | 6 | Segment Complete (T) | (*) | |
| | 7 | Segment Complete (R) | (*) | |
| | 8 | Dump Flag | (*) | |
| | 9 | Illegal Command Code | (*) | (3) |
| | 10 | Improper Fetch Cycle | (*) | |
| | 11 | Spare (Software flag) | | |
| | 12 | Odd Character A | | |
| | 13 | Transmit Time-Out | (*) | (4) |
| | 14 | Short Receive Block (flag) | (*) | |
| | 15 | Interrupt Pending | | |
| WORD 2 | | CSTR status word 1 if CSTR interrupt CSCI transmit register content otherwise | | |
| WORD 3 | | CSTR status word 2 if CSTR interrupt; chain register (T) otherwise | | |
| WORD 4 | | Address register (R) | | (5) |

TABLE S - V

CSTR STATUS

| Bit | |
|---|---|
| 0 | "0" |
| 1 | Receive Time-out |
| 2 | Text Time-out |
| 3 | SRP Flag |
| 4 | Buffer Overflow |
| 5 | CRC or Parity Error |
| 6 | Control Character |
| 7 | Previous Character = DLE - Spare (Ignore) |
| 8–15 | Last Character |
| 16 | "1" |
| 17–23 | Low order 7 bits of first text character |
| 24–31 | Second text character |

TABLE S - VI

STATUS PROCESS

| | |
|---|---|
| 0 | bit number$_1$ |
| 1 | branch address$_1$ |
| 2 | bit number$_2$ |
| 3 | branch address$_2$ |
| 4 | . |
| . | . |
| . | . |
| 2n−2 | bit number$_n$ |
| | branch address$_n$ |
| | FFFF$_{16}$ |

TABLE S - VII

STATUS FLAG

| | | |
|---|---|---|
| 0 | word No. | bit No. 1 |
| 1 | Flag address 1 | |
| 2 | word No. | bit No. |
| 3 | Flag address 2 | |
| 4 | . | |
| . | . | |
| . | . | |
| 2n−2 | word No. | bit No. |
| | Flag address$_n$ | |
| | FFFF$_{16}$ | |

Some flags are: SRP flag and short block flag.

When checking a status entry, the interpreter first sets the status flags as specified in the status flag table. The interpreter then checks the bits specified in the status process table and takes the appropriate action for any bits which are set. When control is passed to another component by the interpreter, the status is converted to an internal code and any protocol is converted to an internal code Tables S-VIII and S-IX. The action taken for each status bit is shown on Table S-X.

When a TR interrupt bit is set, the interpreter references a TR status process table which has the format shown in Table S-VI. If a control character is indicated and the SRP flag is set, then a timeout has been stopped and the "timeout off" routine is called to decrement the timeout count and start another timeout if the count is nonzero. The time-out count is incremented whenever a timeout is needed by the handler. A more detailed description of the status and protocol interpretations Table S-XI is as follows.

The transmit portion of the communications handler comprises the following segments: transmit initiator Table R-II; transmit chain maintenance Table R-IV; and, transmit interpreter Table R-V. When a message is to be transmitted, Message Switch queues up the transmit initiator. The format of the queue entry passed to the initiator by Message Switch is shown in Table S-XII.

The transmit initiator uses the port ID to find the appropriate port Tables S-I, S-II and S-III. The initiator gets the first message on the output queue and determines the number of transmission blocks required to transmit the message.

TABLE S - VIII

STATUS INTERNAL CODE

| Internal Code | Status |
|---|---|
| 1 | CRC error |
| 2 | Buffer overflow |
| 3 | Text timeout |
| 4 | Illegal Command Code (R) |
| 5 | Illegal Command Code (T) |
| 6 | Receive Timeout |
| 7 | Segment Complete (R) |
| 8 | Segment Complete (T) |

TABLE S - IX

PROTOCOL INTERNAL CODE

| Internal Code | Protocol | ASCII code |
|---|---|---|
| 20 | ACK | 86 |
| 21 | NAK | 15 |
| 22 | NAKD | |
| 23 | RSP | 85 |
| 24 | ETB | 97 |
| 25 | ETX | 83 |

TABLE S - X

STATUS INTERPRETATION

| Status | bit | word | Action |
|---|---|---|---|
| Dump Flag | 8 | 0 | Skip 16 words of status |
| ATI denied | 0 | 0 | Abort |
| Memory Read Parity Error | 5 | 0 | Abort |
| Odd Character | 12 | 0 | Abort |
| Improper Fetch Cycle | 10 | 0 | Abort |
| Transmit Timeout | 13 | 0 | Initiate IDLE message |
| Illegal Command Code | 4 | 0 | Go to receive chain maintenance or to transmit chain maintenance |
| Segment Complete (T) | 6 | 0 | Release a transmit list and update transmit chain |
| Segment Complete (R) | 7 | 0 | Release a receive list and update receive chains |
| Halt status | 2 | 0 | Link pending protocol to transmit chain |
| TR interrupt | 1 | 0 | Check TR status |
| Receive Timeout | 1 | 1 | Send RSP |
| Text Timeout | 2 | 1 | Send NAK for the expected sequence number |
| Buffer overflow | 4 | 1 | Send NAK for the expected sequence number and initiate receive chain |
| CRC error | 5 | 1 | Send NAK for expected sequence |

TABLE S - X-continued

STATUS INTERPRETATION

| Status | bit | word number | Action |
|---|---|---|---|
| Control Character | 6 | 1 | Get control character |

TABLE S - XI

PROTOCOL INTERPRETATION

| Control Character | Action | Component |
|---|---|---|
| ACK | Release the acknowledged block | Transmit Interpreter |
| NAK | Retransmit the indicated block | Transmit Interpreter |
| RSP | Retransmit the indicated response | Receive Interpreter |
| ETB | Process the block received | Receive Interpreter |
| ETX | Same as ETB | Receive Interpreter |
| NAKD | Abort | Abort Processor |

TABLE S - XII

INITIATOR QUEUE ENTRY

| | | |
|---|---|---|
| 0 | Forward Pointer | |
| 1 | Backward Pointer | |
| 2 | Initiator TCB address | |
| 3 | Message Switch TCB address | |
| 4 | Start (=0) Indicator | Parameter (=1) Release Indicator |
| 5 | | |
| 6 | Port ID | |
| 7 | Buffer Address | |

TABLE S - XIII

MESSAGE CONTROL BLOCK (BCB FOR MESSAGE)

| | |
|---|---|
| 0 | Forward pointer |
| 1 | Pending transmission block count |
| 2 | Word count of first block |
| 3 | |
| 4 | |
| 5 | Message Start time |
| 6 | Message Start time |
| 7 | Backward pointer |
| 8 | |
| . | Message ↑ ↓ |

The message control block (eight words preceding the message) is set up as shown in Table S-XIII. The message control block is not transmitted. Each transmission block in the message is passed to the "block transmit" routine to be transmitted. The "block transmit" routine (XMTBLK) Table R-III expects a block management information entry Table S-XIV. The BMI must be set up by the routine calling XMTBLK. The BMI space must be requested from the list space manager described in the next section. The initiator assigns the next sequence number Table XV to the transmission block and a transmission block number is determined by the number of transmission blocks already sent for the message. The ETX (end of text) flag is set in the BMI of the last transmission block for the message. The message is delinked from the output queue.

XMTBLK (the "block transmit" routine) links the Block Management Information entry (BMI) to the tail of the active queue. The transmission block is then transmitted preceded by its two words of sequence number and transmission block number. The transmission block will be sent as several intermediate transmission blocks (depending on the intermediate transmission blocking size). FIG. 11 illustrates the BMI active queue. XMTBLK makes calls to the transmit chain maintenance (XMITER) component to get an ATI list built and linked for each call.

The transmit chain maintenance component (XMITER) Table R-IV is called by any component wishing to transmit data or protocol. When a transmit request is made the appropriate list is built and, if the list is for a data transfer, the list is linked to the end of the transmit chain. If the list is for protocol, the list is linked to the end of a pending protocol chain and a HALT command is issued to the CSCI (unless a HALT has already been issued).

TABLE S - XIV

BLOCK MANAGEMENT INFORMATION

| | | |
|---|---|---|
| 0 | | Forward Pointer |
| 1 | | Backward Pointer |
| 2 | | Message control block pointer |
| 3 | | Sequence number |
| 4 | ETX flag | Transmission block number |
| 5 | | block pointer |
| 6 | | word count |
| 7 | | |
| 8 | | |
| 9 | | NAK count |
| 10 | | Block Start time |
| 11 | | Block Start time |

TABLE S - XV

SEQUENCING INFORMATION TRANSMITTED PRECEDING EACH TRANSMISSION BLOCK

| Sequence Number (15 bits) | |
|---|---|
| ETX Flag (bit 0) | Transmission block number |

The hardware will halt when a halt enable is detected in the transmit chain. The status interpreter will pass control to XMITER when the HALT status is detected. The pending protocol will be linked to the head of the transmit chain and at ATI is issued to continue execution of the chain. HALT enable is not set in protocol lists. If no protocol is outstanding when the HALT status is serviced, an immediate ATI is issued to restart the chain.

Recovery transmission blocks are given the priority of protocol for the linking process. The transmit interpreter Table R-V maintains an active BMI queue as illustrated in FIG. 11 which is linked in the order in which responses are expected. When a HALT status is detected, the transmit chain is scanned for the first "transmitter type" list. The sequence number in the list is passed to the transmit interpreter which updates its active BMI queue. A flag is set in each list to indicate whether it is initiated by the transmitter, the receiver, or neither.

XMITER releases list space whenever a segment complete on the transmit chain occurs. The status interpreter passes control to XMITER whenever it detects a SEGMENT COMPLETE (T) status. Since data transfer lists are linked to the end of the transmit chain without halting the CSCI, an illegal code is always stored in the last list of the chain to indicate when the hardware has completed the transmit chain. Illegal codes are also used for the receive chain. Bit 7 in the illegal code indicates a transmit list if it is set to one. Bits 12–15 are used to identify the list which has the illegal code. When a transmit (or receive) list is built, the list builder routine assigns an illegal code to the list and stores the address of list in an illegal code table S-XVI. The illegal code is determined by using the next available number and then incrementing the number for the next list. The illegal code always has bit 0 on. The illegal code identifying number ranges from 0 to a sysgen.

When an illegal code status is detected, the status interpreter checks whether bit 7 is on or off. If bit 7 is on, control is passed to XMITER. Since the segment complete bit is not set on the last list of a chain, the list in which the illegal code occurred is released by XMITER. If some lists were linked to the chain before the illegal code status was serviced, an ATI is issued for the new lists. Any pending protocol is linked to the head of the transmit chain on an illegal code.

The list chains, recovery lists, and BMI queue all require small chunks of memory in varying amounts. These small chunks are retrieved from free memory by first requesting a block of 128 words. The 128 word block is then allocated to the segments which require list space. When the block is completely or nearly completely reserved and another component needs space, another request is made for a 128 work block. The blocks are linked together and the last requested (or last retrieved) block is at the head of the chain. Each 128 word block is provided with four words of memory management (three preceding the block and one at the end of the block). The list space manager will use two of the overhead words preceding the block and two or more words in the block for reservation bits. To get 128 words of list space a block of 130 words is requested.

The block header information is shown in Table S-XVII.

TABLE S - XVI
ILLEGAL CODE/LIST ADDRESS

Table Size (maximum = 256 loc.)
Next available number

TABLE S - XVI-continued
ILLEGAL CODE/LIST ADDRESS

| | |
|---|---|
| 0 | List address₁ (Illegal Code bits 12–15 = 0) |
| 1 | List address₂ (Illegal Code bits 12–15 = 1) |
| 2 | . |
| 3 | . |
| 4 | |
| 5 | |
| 6 | |
| 7 | |
| 8 | |
| 9 | |
| 10 | |

TABLE S-XVII
128 WORD LIST SPACE BLOCK

| Reserve Bit | Block Size |
|---|---|
| | Forward Pointer |
| | Backward Pointer |
| | Reserve Bits (word 1) |
| | Reserve Bits (word 2) |
| | Four Words (bit 15, word 1) |
| | Four Words (bit 14, word 1) |
| | . |
| | . |
| | Four Words (bit 0, word 2) |
| Reserve Bit | Block Size |

TABLE S-XVIII
SRP MESSAGE FORMAT

| ←16 Bits→ | ←16 Bits→ | ←8 Bits→ | ←16 Bits→ | → ← 16 Bits |
|---|---|---|---|---|
| DLE SRP | Sequence Number | Response Character | DLE ETX | B C C |

Each bit in the reserve bit words indicates whether a corresponding set of four words is reserved or free. If the bit is one, then the four words are reserved. When a segment requests space, the list space manager goes to the first block of list space and searches the reserve words for the requested amount of space (rounded up to a multiple of four). If the space is not found in that block, the routine proceeds to the next block and searches it for space. When space is found, the appropriate bits are set to one and the space address is passed to the calling segment.

When space is released by a component, the management routine will search the list space blocks starting at the tail of the queue. When the correct block is found, the appropriate reserve bits in the reserve words are turned off. If all of the reserve bits are off, the space is released to free memory.

The transmit interpreter (XMTINT) Table R-V determines what action should be taken on protocol and status related to transmissions. The status interpreter determines which protocol and status should be passed to transmit interpreter. The protocol passed to the transmit interpreter (XMTINT) are ACK, NAK, and receive timeout. The actions taken for the protocol and status are described below.

When the transmit interpreter gains control, it changes the executing task control block pointer (ETCBP) to point to the transmit interpreter task control block. If the transmit interpreter must wait for memory at some point; the initiator, status interpreter, and receive interpreter can still excecute.

A protocol character is sent in an SRP message wih a corresponding sequence number as shown in Table S-XVIII. The sequence number is checked for validity by comparing it to the expected sequence number. If the received sequence number is less than the expected number, the BMI active queue, as shown in FIG. 11, is searched for the received number. If the number is not found on the BMI active queue or if the number is greater than expected and is outside an acceptance window the protocol is ignored and the receive timeout is restarted to allow for the bad protocol. If the number appears to be valid, the BMI active queue, shown in Table S-XIV in conjunction with FIG. 11, is searched for an entry corresponding to the sequence number. If an entry is not found, the protocol is treated as invalid. If the number is valid but greater than the expected number, RSP's are sent for the missing numbers. This sequence number validation occurs for both ACK's and NAK's.

The BMI active queue, shown in Table S-XIV in conjunction with FIG. 11, is linked in the order in which block responses are expected. If a response is received out of order, an RSP message is sent for each of the missing responses. The BMI for each block which had a missing response will be linked to the tail of a transmit recovery queue unless the BMI active queue is empty. Also, when a NAK for a block is received the BMI for the block is linked to the transmit recovery queue. To link either protocol or recovery blocks to the transmit chain, XMITER halts the hardware. When the halt status is processed by XMITER and the protocol and recovery blocks are linked to the transmit chain, XMITER returns the sequence number of the "transmitter" type list closest to the head of the transmit chain before the relink operation is performed. The returned sequence number is used to find the point at which the transmit recovery queue entries are to be linked into the BMI active queue.

As an example, consider FIG. 12 which shows the order of linkage of the BMI active queue and the transmit chain when a NAK for block 12 is received. A response for block 11 was expected so an RSP must be sent for 11 and block 12 must be retransmitted. FIG. 13 shows the transmit recovery queue, BMI active queue and transmit chain just prior to servicing the HALT complete status. The HALT is effective following the transmission of block 2. The BMI for 2 remains on the BMI active queue until a response is received for 2. FIG. 14 illustrates the queue linkage after the HALT status is serviced by XMITER. XMITER links the protocol and recovery block(s) to the start of the transmit chain and 13 is passed to the transmit interpreter by XMITER. XMTINT then inserts the transmit recovery queue entries into the BMI active queue preceding the BMI for 13. XMTINT now expects responses in the order 2, 11, 12, 13, 14, 15 . . . as shown by the BMI active queue.

When a valid ACK has been received, XMTINT retrieves the transmission block number in the appropriate BMI. When a transmission block has been acknowledged, that block is released to free memory unless the transmission block is the first transmission block in a message. That first block is not released until the entire message has been acknowledged because the message control block remains reserved until then. The BMI for an acknowledged block is taken off the BMI active queue and released.

When all the transmission blocks for a message have been acknowledged, the message control block and remaining transmission block are released to free memory. The output buffer count is then decremented and if the count is zero, no buffers are waiting to be transmitted or waiting for responses.

The occurrence of a receive timeout indicates a missing response. If the BMI active queue has one or more entries in it, an RSP is sent for the sequence number in the BMI at the head of the queue and the BMI is linked to the transmit recovery queue as described in section Y. Another timeout is started anticipating the response to the RSP.

It is possible for an SRP message to be received (which stops the timeout) immediately followed by another SRP message such that the second SRP message is received before another timeout is started. Even though the second SRP did not stop a timeout, an additional timeout is eventually started for the second SRP. This means extra timeouts may occur when no responses are expected. When the BMI active queue becomes empty, the timeout count is zeroed and the CSCI is issued a STOP TIMEOUT command to prevent the extra timeouts. Since the BMI queue indicates the number of expected responses, the timeout is started whenever an entry is added to an empty BMI queue. Whenever an entry is taken off the BMI queue and the BMI queue is not empty, the timeout is restarted.

When a valid NAK is received, the appropriate BMI is delinked from the BMI active queue. The BMI is then linked to the recovery queue and the address of the BMI is passed to the "transmit block" routine (XMTBLK) Table R-III and the block is retransmitted with the priority of protocol.

The receiver is constantly prepared to receive data. A message is sent as one or more transmission blocks which are combined to form the message block which is passed to message switch. The receiver software is comprised of: receive chain maintenance (RCVR) Table R-VI; receive interpreter (RCVINT) Table R-VII; and, message consolidator (UNIFY) Table R-VIII. These segments are described in detail below.

The receive chain maintenance routine (RCVR) Table R-VI is given execution by either the status interpreter Table R-V or by some other segment wishing to initiate more receive lists. The status interpreter passes control to RCVR when the following statuses are detected: an illegal code for receive chain; or, a segment complete (R).

Segment complete (R) indicates that a receive list has been completed; so RCVR updates the head of receive chain pointer Table S-II, releases the list space and decrements the list count. RCVR then attempts to initiate more receive lists as described below.

RCVR will continue to try to build receive lists until a list limit is reached or memory is not available. A request is made to GETMEM for a block of memory the size of a transmission block plus eight words. If memory is not available, control is returned to the calling program. When memory is available, a list is built to receive into that block of memory. Space is allowed for a buffer control block of eight words. The first two words of text are sequence number Table S-XV. The first two words of text are received into the buffer control block at words 6 and 7. The receive list is linked to the end of the receive chain and the list count is incremented. RCVR then proceeds to build more lists as described above.

An illegal code for the receiver indicates that the receive chain has been completed by the hardware. RCVR checks whether additional lists were linked to the chain after the chain was complete, but before the illegal code status was serviced. If additional lists do exist, the lists are reissued by an ATI. RCVR now attempts to build more receive lists as described above. When memory is no longer available for more receive lists or when the list count limit is reached, control is passed to the status interpreter.

Space for the receive lists is requested from and released to the list space manager. The list space manager is described below.

The receive interpreter (RCVINT) Table R-VII is put into execution by the status interpreter whenever protocol or status applicable to the receiver are detected. Upon gaining execution, the receive interpreter (RCVINT) replaces the contents of ETCBP (executing task control block pointer) with the address of its own task control block. If RCVINT must wait for memory, the status interpreter and transmit interpreter can continue execution. The receive interpreter (RCVINT) is given control for protocol (RSP); data blocks; and, errors (CRC errors, overflow, and text timeout).

When an error is detected, RCVINT sends a NAK for the block it expected to receive Table S-I. If an overflow is detected, RCVR is called to start receive lists. If a list is active when the overflow occurs, the associated block is released. After a NAK is sent for the expected sequence number, the sequence number is placed in a NAK list and the expected sequence number is incremented. The NAK list is described below.

An RSP is a request that a response be retransmitted for the specified sequence number. If the sequence number is larger than the sequence number of the next expected block, but within the acceptance window; a NAK is sent for that sequence number and a NAK is sent for each of the missing blocks. The assumption is that some of the RSP's were lost. If the sequence number specified by the RSP is less than the sequence number of the next expected block and the sequence number appears in the NAK list, a NAK is retransmitted for that block. If the specified number does not appear in the NAK list, then it is assumed that the block was received without error and an ACK is sent for the block. If the specified number is too large, the RSP protocol is ignored. If the RSP was garbled, the transmitter expects a response for the ignored RSP and eventually sends another RSP.

RCVINT is given execution by the status interpreter when a transmission block has been received. RCVINT determines the actual block size and builds the buffer control block as shown in Table S-XIX. If the block has the expected sequence number, the expected sequence number parameter is incremented and an ACK is sent for the block. If the number is larger than expected; a NAK is sent for each of the missing blocks, an entry is made for each missing block in the NAK list, and the expected sequence number is incremented to include the last received block. An ACK is sent for the block. If the sequence number of the block is outside the acceptance window, the block is discarded.

If a block with a sequence number less than the expected number is received and the number appears in the NAK list, an ACK is sent for the block and the number is taken out of the NAK list. If the number does not appear in the NAK list, the block is discarded.

After a block has been successfully received, the block is passed to the message consolidator (UNIFY) shown in Table R-VIII. RCVINT makes a queue entry for UNIFY Table S-XX and links the queue entry to the tail of the queue for UNIFY unless the block is a recovery block (a retransmission).

TABLE S-XIX

BUFFER CONTROL BLOCK FOR INPUT TO MESSAGE CONSOLIDATOR

| | | |
|---|---|---|
| 0 | | Forward Pointer |
| 1 | | Sequence Number |
| 2 | ETX Flag | Transmission Block Number |
| 3 | | Block size |
| 4 | | |
| 5 | | |
| 6 | | Reserved |
| 7 | | Backward Pointer |
| | | Data ↕ |

TABLE S-XX

UNIFY QUEUE ENTRY

| | |
|---|---|
| 0 | Forward Pointer |
| 1 | Backward Pointer |
| 2 | UNIFY TCB address |
| 3 | Receiver TCB address |
| 4 | SI    PRI |
| 5 | |
| 6 | Port ID |
| 7 | Block address |

A recovery block queue entry is linked to the head of the queue for UNIFY. All data following an erroneous block must wait until the recovery block is received, so the recovery blocks are given highest priority in the queue.

The format of a NAK list segment is shown in Table S-XXI. Each segment of the NAK list has a header of four words with contents as shown in Table S-XXI. Following the header are a number of slots into which the sequence numbers of NAK'ed blocks are placed. Empty slots are filled with zero. When a NAK list segment becomes completely empty, the segment is released to free memory.

After a recovery block has been received, the list is searched for the corresponding sequence number. When the number is found, a zero is stored in the slot. If the entire segment is then empty, the segment is released. To prevent a particular segment of free memory being continuously reserved for the NAK list, the slots are not reusable. When another entry must be made in the NAK list and the end of the current segment has been reached, another block of memory is requested for the next NAK list segment. The new segment is linked to the head of the chain of NAK list segments. When searching the NAK list for a number, the search proceeds from the tail of the queue. When searching for a slot, only the segment at the head of the chain is checked for space.

The sequence numbers will be in the order in which recovery blocks are expected. If a number is skipped, the transmitter will be expected to send an RSP for that number. Whenever the list is searched for a number and that number is found, the number is automatically taken out of the NAK list.

TABLE S-XXI
NAK LIST SEGMENT FORMAT

Forward Pointer
Backward Pointer
Number of empty slots
Next slot available
   entry 1
   entry 2
   .
   .
   entry n
   slot 1
   slot 2
   .
   .
   slot m

TABLE S-XXII
PORT QUEUE TABLE

| | |
|---|---|
| 0 | Queue entry table pointer for port 0 |
| 1 | Queue entry table pointer for port 1 |
| 2 | . |
| 3 | . |
| 4 | . |
| 5 | . |
| 6 | . |
| 7 | Queue entry table pointer for port 7 |
| | Channel 0 flag |
| | Channel 1 flag |

If another NAK is sent for that number, the number is reentered in the NAK list.

The message consolidator (UNIFY) Table R-VIII takes transmission blocks as input and consolidates the blocks into a block of memory to form a text block or message which is passed to message switch. UNIFY is queued up by RCVINT (receive interpreter) Table R-VII whenever a transmission block has been successfully received. The format of the queue entry is shown in Table S-XX. The buffer control block for the transmission block must be formatted as shown in Table S-XIX.

When UNIFY runs out of memory, it formats a queue entry for itself with a zero block address. An entry is made in the port queue Table S-XXII which indicates which ports have an outstanding "no memory" queue entry. Only one such queue entry is made for each port/channel. When such a queue entry is detected by UNIFY the table entry the port/channel is deleted. The program will have a structure which will allow multiple channels/port but the flag table for each port, shown in Table S-XXII, only allows for channel 0.

When UNIFY gets execution, it uses the port ID from the queue entry to set up a pointer to the port data table, Table S-I. A flag is set indicating that a block queue entry is being processed. If the ETX flag is set for the block Table S-XIX and the transmission block number is zero, then the block is the first and last block of a message and the message is complete. If the block size is two, indicating that only a sequence number was transmitted; the block is released. Messages containing only a sequence number are assumed to be idle messages from the transmitter.

Transmission blocks for messages which require more than one block are not in contiguous memory. A block of memory for the entire message is retrieved from free memory and the data in the transmission blocks is moved into the message block. A transmission block has two sequence numbers associated with it, Table S-XV. The transmission block number indicates where the data in the transmission block should be placed in the message block. The sequence number of the first transmission block in a message is assigned to the message block and is used to locate the message block whenever a transmission block for that message is received. When a transmission block is received the sequence number of the message block is determined by subtracting the transmission block number from the sequence number for the block. The input queue of message blocks is then searched for that message block. If the message block is not on the queue, then memory is requested for a message block. If memory is available, the message control block is formatted as shown in Table S-XXIII and the message is linked to the input queue.

The input queue is kept ordered with the lowest numbered message at the head of the queue. The message at the head of the queue is completed and passed to message switch before any of the other messages can be passed to message switch. Whenever a message block is to be linked to the input queue, UNIFY searches the queue for the point of insertion for the block based on the sequence number.

When the message block is found, the transmission block number is used to calculate the address at which the data is to be stored. The transmission block number (TBN) is multiplied by the transmission block size (TBS) and is added to the first word address of the message. The data is transferred from the transmission block to the message block.

TABLE S - XXIII
MESSAGE CONTROL BLOCK FOR BLOCKS ON THE INPUT QUEUE

Forward Pointer
Message sequence number
ETX transmission block number
Number of blocks received
Reserved
Backward Pointer Message ↕

If the ETX flag is set for the transmission block, the transmission block number is stored in the message control block, Table S-XXIII. When the number of blocks received for the message equals the transmission block number plus one of the LTX block, then the message is complete.

After an ETX block is received, the length of the message is known and the unused space in the message block is released if more than 64 words are unused. The transmission block is released to free memory after the data it contained is moved to the message block. Transmission blocks containing the entire message are linked to the input queue and are not released.

After a message has been completed, UNIFY checks whether the message is at the head of queue or not. If it is at the head of the queue, the message is passed on to message switch and then UNIFY checks whether the next message on the input queue is complete and gives it to message switch if it is ready. When the message at the head of the input queue is not complete, the pending transmission block queue is searched.

When UNIFY cannot get memory for a message block, the transmission block that UNIFY was processing is linked to the tail of the pending transmission block queue and a "no memory" queue entry is made for the port. Whenever UNIFY finishes processing a transmission block, it searches the pending transmission block queue for entries and processes the transmission blocks on the queue. UNIFY attempts to process every block on the queue even though some may be skipped because of lack of memory for a message block. When all of queue has been checked or processed, control is passed to the call processor. The pending transmission block is kept ordered from low to high as the input queue is also ordered.

Various embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will without departing from the spirit and scope of the invention, be apparent to persons skilled in the art.

What is claimed is:

1. In a communications system in which a first and a second station, each having a transmitter and receiver portion, simultaneously transmits and receives blocks of data, a method of controlling the stations including the steps of:
   a. continuously transmitting blocks of data including a respective identification code for each block of data from each station to the other station;
   b. checking the received blocks of data at the receiving portion of each station to determine if the received blocks of data contain errors;
   c. acknowledging receipt of those blocks determined to be correctly received;
   d. storing at each station the identification codes of those blocks of received data which contain an error;
   e. transmitting the identification code of the blocks of received data which contain errors from the receiving portion of each station to the transmitting portion of the other station when the transmitting portion of the other station becomes available without interrupting the flow of blocks of data in either direction; and
   f. retransmitting from each of the transmitting portion to each of the opposite receiving portions only those blocks of data which contained errors as indicated by the identification codes received from the receiving portions.

2. The method of claim 1 wherein the step of checking the received blocks of data further comprises:
   b.
      i. generating a cyclic redundancy code at the transmitting portion of each station;
      ii. generating a cyclic redundance code at the receiving portion of each station; and
      iii. comparing the transmitting portion code of each station with the receiving portion code of the other station respectively.

3. A communications system for transmitting blocks of data having first and second stations, each of the stations including both transmitter and receiver portions, for the simultaneous transmission of blocks of data from the first station to the second station and from the second station to the first station, each of the stations comprising:
   a. means in the transmitter portion for continuously transmitting blocks of data including a respective identification code for each block of data to the receiver portion of the other station;
   b. means in the receiver portion for checking the received blocks of data for error;
   c. means in the receiver portion for acknowledging receipt of the blocks of data determined to be correctly received;
   d. means in the receiver portion for storing the identification codes of those blocks of received data which contain an error;
   e. means in the transmitter portion for transmitting the identification code of the blocks of received data which contain errors to the other station when the receiver portion of the other station becomes available without interrupting the flow of blocks of data in either direction; and
   f. means in the transmitter portion responsive to the identification codes of blocks of data containing errors as received from the other station for retransmitting to the other station only those blocks of data which contain errors.

4. The system of claim 3 further comprising means in the transmitter portion for dividing the numeric binary value of each data block by a constant and for transmitting a code representative of the remainder of such division to the receiver portion.

5. The system of claim 4 wherein the means for checking the received data further comprise means for comparing the remainder of the division with a remainder provided by the transmitter portion for the same block of data.

* * * * *